(12) United States Patent
Taunton

(10) Patent No.: US 7,546,329 B2
(45) Date of Patent: *Jun. 9, 2009

(54) SYSTEMS FOR PERFORMING MULTIPLICATION OPERATIONS ON OPERANDS REPRESENTING COMPLEX NUMBERS

(75) Inventor: Mark Taunton, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 1008 days.

This patent is subject to a terminal disclaimer.

(21) Appl. No.: 10/951,867

(22) Filed: Sep. 29, 2004

(65) Prior Publication Data

US 2005/0071414 A1    Mar. 31, 2005

Related U.S. Application Data

(60) Provisional application No. 60/506,355, filed on Sep. 29, 2003.

(51) Int. Cl.
*G06F 7/52* (2006.01)
*G06F 7/38* (2006.01)

(52) U.S. Cl. .................................... 708/622; 708/511

(58) Field of Classification Search ................ 708/622, 708/511
See application file for complete search history.

(56) References Cited

U.S. PATENT DOCUMENTS 3,800,130 A * 3/1974 Martinson et al. ........... 708/622

| 4,354,249 | A | * | 10/1982 | King et al. | 708/622 |
| 5,262,976 | A | * | 11/1993 | Young et al. | 708/628 |
| 5,576,983 | A | * | 11/1996 | Shiokawa | 708/622 |
| 5,936,872 | A | * | 8/1999 | Fischer et al. | 708/622 |
| 7,051,061 | B2 | * | 5/2006 | Becker | 708/511 |
| 2002/0161813 | A1 | * | 10/2002 | Chiueh et al. | 708/622 |
| 2002/0169813 | A1 | * | 11/2002 | Pechanek et al. | 708/622 |

* cited by examiner

*Primary Examiner*—Tan V Mai
(74) *Attorney, Agent, or Firm*—Sterne, Kessler, Goldstein & Fox, P.L.L.C.

(57) ABSTRACT

A method for multiplying, at an execution unit of a processor, two complex numbers in which all four scalar multiplications, concomitant to multiplying two complex numbers, can be performed in parallel. A real part of a first complex number is multiplied at the execution unit by a real part of a second complex number to produce a first part of a real part of a third complex number. An imaginary part of the first complex number is multiplied at the execution unit by an imaginary part of the second complex number to produce a second part of the real part of the third complex number. A first arithmetic function is performed at the execution unit between the first part of the real part of the third complex number and the second part of the real part of the third complex number. The imaginary part of the first complex number is multiplied at the execution unit by the real part of the second complex number to produce a first part of an imaginary part of the third complex number. The real part of the first complex number is multiplied at the execution unit by the imaginary part of the second complex number to produce a second part of the imaginary part of the third complex number. A second arithmetic function is performed at the execution unit between the first part of the imaginary part of the third complex number and the second part of the imaginary part of the third complex number.

35 Claims, 16 Drawing Sheets

SYSTEMS FOR PERFORMING MULTIPLICATION OPERATIONS ON OPERANDS REPRESENTING COMPLEX NUMBERS

CROSS-REFERENCE TO RELATED APPLICATIONS

This application claims the benefit of U.S. Provisional Application No. 60/506,355, filed Sep. 29, 2003, which is incorporated herein in its entirety by reference.

BACKGROUND OF THE INVENTION

1. Field of the Invention

The present invention relates to multiplying complex numbers with a processor.

2. Related Art

In older designs for signal processing systems (such as a Digital Subscriber Line (DSL) modem), which are in general more hardware oriented, the signal equalization process and other processes, such as performing a Fast Fourier Transform (FFT), may be performed by fixed-function logic circuits. However, such system designs are commonly hard to adapt for varying application requirements. In order to increase flexibility in modem development and application, it has become more common to use software to perform the various functions in a signal processing device. As performance levels (such as data-rates) required of such devices increase, the requirements of the software efficiently to perform individual processing tasks (such as equalization or FFT) likewise increases.

Performing complex multiplication in software is somewhat complicated to implement. Using conventional instructions (e.g., scalar multiply, add, subtract) it may take many cycles to perform complex multiplication. In some circumstances (e.g., in a DSL modem) it may be necessary to perform millions of complex multiplications every second, as part of the Fast Fourier Transform (FFT) and/or equalization processes.

The complex multiplication process can therefore represent a significant proportion of the total computational cost for a signal processing system, especially in the case of a system where one processor handles the operations for multiple independent processing channels (e.g., in a multi-line DSL modem in a central office). With increasing workloads—in respect of the increasing complexity of the signal processing protocols (e.g., the number of frequencies for which equalization may be needed, in each channel)—it becomes necessary to improve the efficiency of complex multiplication in such systems.

For these and other reasons, more efficient methods and systems for complex multiplication operations are needed.

BRIEF SUMMARY OF THE INVENTION

The present invention provides a method for multiplying, at an execution unit of a processor, two complex numbers in which all four scalar multiplications, concomitant to multiplying two complex numbers, can be performed in parallel. First data is conveyed along at least a first interconnect of the processor. The first data has a first operand. The first operand represents a first complex number. Second data is conveyed along at least a second interconnect of the processor. The second data has a second operand. The second operand represents a second complex number. The first operand is multiplied at the execution unit by the second operand to produce a first result. The first result represents a third complex number.

In an embodiment, a most significant bits portion of the first operand represents an imaginary part of the first complex number, a least significant bits portion of the first operand represents a real part of the first complex number, a most significant bits portion of the second operand represents an imaginary part of the second complex number, a least significant bits portion of the second operand represents a real part of the second complex number, a most significant bits portion of the first result represents an imaginary part of the first result, and a least significant bits portion of the first result represents a real part of the first result.

The processor can multiply the first operand by the second operand in the following manner. The least significant bits (real) portion of the first operand can be multiplied at the execution unit by the least significant bits (real) portion of the second operand to produce a third (real) operand. The most significant bits (imaginary) portion of the first operand can be multiplied at the execution unit by the most significant bits (imaginary) portion of the second operand to produce a fourth (real) operand. The fourth (real) operand can be subtracted at the execution unit from the third (real) operand. A fifth (real) operand can be a difference of the subtracting. The most significant bits (imaginary) portion of the first operand can be multiplied at the execution unit by the least significant bits (real) portion of the second operand to produce a sixth (imaginary) operand. The least significant bits (real) portion of the first operand can be multiplied at the execution unit by the most significant bits (imaginary) portion of the second operand to produce a seventh (imaginary) operand. The seventh (imaginary) operand can be added at the execution unit to the sixth (imaginary) operand. An eighth (imaginary) operand can be a sum of the adding. Advantageously, the four scalar multiplications can be performed in parallel. Advantageously, the subtraction and the addition can also be performed in parallel.

Optionally, the present invention can also be extended so that a single instruction causes multiplication operations to be performed on additional pairs of complex numbers. In addition to the first operand, the first data can also have a ninth operand. The ninth operand can represent a fourth complex number. The ninth operand can be a most significant bits portion of the first data. The first operand can be a least significant bits portion of the first data. In addition to the second operand, the second data can also have a tenth operand. The tenth operand can represent a fifth complex number. The tenth operand can be a most significant bits portion of the second data. The second operand can be a least significant bits portion of the second data. The ninth operand can be multiplied at the execution unit by the tenth operand to produce a second result. The second result can represent a sixth complex number. The first result and the second result can be third data. The first result can be a least significant bits portion of the third data. The second result can be a most significant bits portion of the third data. Advantageously, multiplying the first operand by the second operand can be performed in parallel with multiplying the ninth operand by the tenth operand.

In another embodiment, a real part of a first complex number is multiplied at an execution unit of a processor by a real part of a second complex number to produce a first part of a real part of a third complex number. An imaginary part of the first complex number is multiplied at the execution unit by an imaginary part of the second complex number to produce a second part of the real part of the third complex number. A first arithmetic function is performed at the execution unit between the first part of the real part of the third complex number and the second part of the real part of the third complex number. The imaginary part of the first complex number is multiplied at the execution unit by the real part of the second complex number to produce a first part of an imaginary part of the third complex number. The real part of the first complex number is multiplied at the execution unit by the imaginary part of the second complex number to produce a second part of the imaginary part of the third complex number. A second arithmetic function is performed at the execution unit between the first part of the imaginary part of the third complex number and the second part of the imaginary part of the third complex number. The multiplying steps are performed in parallel.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

The present invention is now described with reference to the figures where like reference numbers indicate identical or functionally similar elements. Also in the figures, the left most digit(s) of each reference number identifies the figure in which the reference number is first used.

DETAILED DESCRIPTION OF THE INVENTION

I. Introduction

A. Complex Numbers

Figure 1:
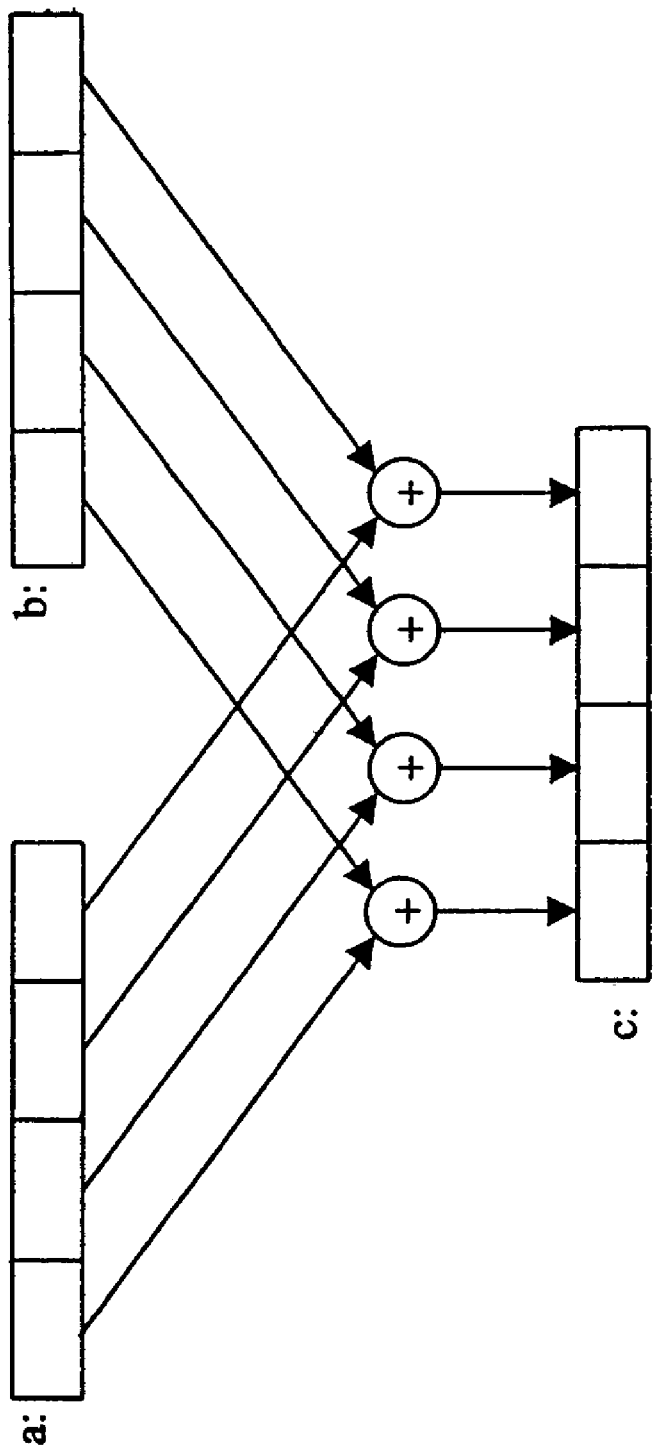
FIG. 1 illustrates an example of a four-way SIMD Add-Half words instruction.

Complex numbers are numbers of the form (a+bi), where i is the square root of minus one, and a and b are real numbers. A complex number is the sum of a real part (a) and an imaginary part (bi). Multiplication and addition of complex numbers possess the same commutative and transitive properties as with real numbers. Complex multiplication is distributive over complex addition. Thus, we can evaluate the multiplication of two complex numbers (a+bi) and (c+di) as follows:

$$(a+bi)(c+di) = ac + cbi + adi + (bi)(di)$$
$$= ac + (cb+ad)i + (bd)(i^2)$$
$$= (ac-bd) + (cb+ad)i$$

Complex numbers have numerous applications in mathematics and engineering. As an example, in signal processing applications, when transformed into the frequency domain, an arbitrary signal can be considered as a function that maps frequency onto a complex number. The real and imaginary parts correspond, respectively, to the relative amplitudes of cosine and sine waves of that frequency. When summed over all frequencies, the amplitudes of the cosine and sine waves make up the signal amplitude.

When a signal is transmitted, its amplitudes and phases are altered, depending upon the resistance, inductance, and capacitance of the circuitry through which the signal passes. In order to recover the original signal, a process of equalization is applied, which can include the step of multiplying a complex amplitude at each frequency by a complex correction-factor, which varies with frequency as it varies with time.

In the abstract, complex numbers have infinite precision. For practical purposes, however, it is usually sufficient to approximate the true value to one of a finite set of values. For example, the real and imaginary components a and b belong to a finite range of integers that are multiplied by a scale-factor. Preferably, the scale-factor is a power of two, either positive or negative. Use of a negative scale-factor allows the representation of values having fractional parts rather than just integers (whole numbers). A fixed-point representation of the numbers can be used if all of the numbers one wishes to use can be represented using a common range of integers and a common scale-factor. Arithmetic between numbers having fixed-point representation is referred to as fixed-point arithmetic.

In other situations, a floating-point representation of the numbers can be used if a suitable common scale-factor cannot be found for the ranges of numbers being manipulated. In this case there is no fixed scale-factor, so the position of the (binary) point between the whole number part (if any) and the fractional part (if any) of each value is not fixed, but rather is said to "float". In a floating point representation of numbers, each number comprises at least a mantissa, which represents an integer, and an exponent, which represents a scale-factor specific to that particular number. Both the mantissa part and the exponent part can in general represent both positive and negative numbers. As with fixed point representation, negative exponents allow the representation of numbers with fractional parts. As will be appreciated, there are many possible ways in which floating point numbers can be represented. For example, the mantissa can be represented using sign and magnitude format or using two's complement format. Likewise, the exponent can be represented as a two's complement number, or in an offset manner, or as a sign and magnitude. Additionally, the mantissa might be represented using a normalized format having an "implicit leading one" in which the most significant non-zero bit of the mantissa is not physically represented in the stored format of the number, but is implied to appear one binary place to the left of the top-most bit of the mantissa as stored. As a further variation, different numbers of bits may be assigned to different parts of a floating point number. By way of an example of a floating point number format, one might use a sign bit of a mantissa, along with an 8-bit offset-128 exponent and a 23-bit magnitude of the mantissa (represented using "implicit leading one") for a total of 32 bits.

The complex-conjugate of a complex number (a+bi) is defined as (a−bi). The concept has many uses within mathematics and engineering. As an example, when performing a Fast Fourier Transform (FFT), it is sometimes necessary to multiply one complex number by the complex conjugate of another. The FFT is commonly used in signal processing applications, such as a Digital Subscriber Line (DSL) modem.

B. Single Instruction Multiple Data Processing

Single Instruction Multiple Data (SIMD), describes a style of digital processor design in which a single instruction controls the processing of multiple data values in parallel (all being processed in the same manner).

SIMD operations can be implemented in digital processor designs by data processing units which receive multiple input values. For example, a 64-bit wide input value can be subdivided into and treated as multiple smaller values (e.g., 8×8-bit values, 4×16-bit values, or 2×32-bit values).

To illustrate SIMD working, consider the following exemplary Add Half-words (ADDH) instruction:

ADDH c, a, b

ADDH c, a, b takes as input two 64-bit operands from registers a and b, and writes its result back to register c. ADDH performs four 16-bit (half-word) additions: each 16-bit value in a is added to the corresponding 16-bit value within b to produce 4×16-bit results in the 64-bit output value c. FIG. 1 illustrates an example of a four-way SIMD Add-Half words instruction.

This SIMD method of working allows for an increase in computational power compared with other types of processors where an instruction can only operate on a single set of input data values (e.g., one 16-bit operand from a, one 16-bit operand from b giving one 16-bit result in c). For situations, such as are common in digital signal processing applications, where the same operation is to be performed repeatedly across an array of values, SIMD allows in this instance a speed-up by a factor of four in the basic processing rate, since four add operations can be performed at once rather than only one.

II. Example Implementations

A. Instruction for Complex Multiplication Operations

An example implementation of the invention is described below. The invention is not, however, limited to the example implementation. Based on the description herein, one skilled in the relevant art(s) will understand that the invention can be implemented in other ways as well. In an embodiment, the example implementation can be used in conjunction with a digital signal processor.

In the example implementation, the instruction is called 'CMULH' (for Complex-MULtiply-Halfwords), but the mnemonic used is incidental here. CMULH is defined to take two 64-bit input operands 'src' and 'src2' and a 64-bit output operand 'dest'. CMULH also takes as input a one-bit flag called 'conjugate' located in a status register called 'BSR'. This flag can be set or cleared beforehand using other instructions according to the required direction of complex multiplication. The new instruction is then:

CMULH dest, src1, src2 which is defined to perform complex multiplication in a two-way SIMD manner by multiplying each of two complex numbers in a register 'src1' by the corresponding complex number in a register 'src2', producing the result as two complex numbers in a register 'dest'.

The operation performed by the instruction is described by the following sub-operations:

```
CMULH_lane(dest.<31..0>, src1.<31..0>, src2.<31..0>, conjugate)
CMULH_lane(dest.<63..32>, src1.<63..32>, src2.<63..32>, conjugate)
CMULH_lane(d, s1, s2) is defined as:
    If: (BSR.conjugate)
    Then:
        {d.re = SAT[RND((s1.re * s2.re) + (s1.im * s2.im))]
         d.im = SAT[RND((s1.im * s2.re) − (s1.re * s2.im))]}
    Else:
        {d.re = SAT[RND((s1.re * s2.re) − (s1.im * s2.im))]
         d.im = SAT[RND((s1.im * s2.re) + (s1.re * s2.im))]}
``` where:

| | |
|---|---|
| val.re | means the lower 16-bits of the 32-bit value 'val', containing the real component of val; |
| val.im | means the upper 16-bits of the 32-bit value 'val', containing the imaginary component of val; |
| (a * b) | means the 32-bit two's-complement signed result of multiplying the two 16-bit two's-complement signed numbers a and b; |
| (a + b) | means the 33-bit two's-complement signed result of adding the two 32-bit two's-complement signed numbers a and b; |
| (a − b) | means the 33-bit two's-complement signed result of subtracting the 32-bit two's-complement signed number b from the 32-bit two's-complement signed number a; |
| RND(x) | means the 18-bit two's-complement result of rounding the real number y = x/32768, such that if the fractional part of y is exactly ½, then the result is the nearest even (i.e., multiple of two) integer to y, otherwise the result is the nearest integer to y; and |
| SAT(x) | means the 16-bit two's complement signed result of saturating (i.e., clipping) x to the nearest integer in the range −32768 to +32767 inclusive. |

B. Method for Multiplying Complex Numbers

Figure 2:
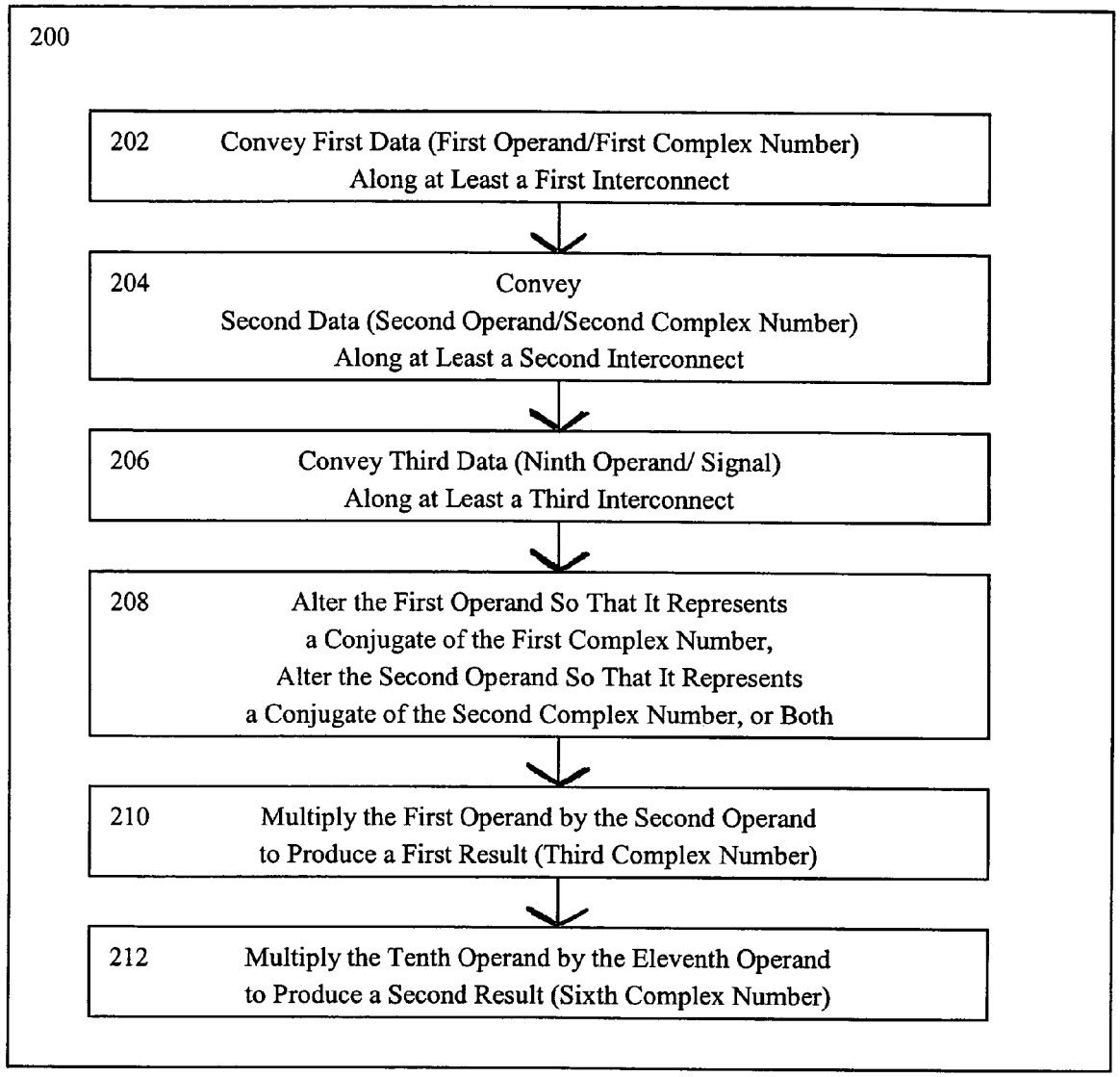
FIG. 2 is a flow chart that illustrates a method 200 for multiplying complex numbers in accordance with an embodiment of the present invention.

FIG. 2 is a flow chart that illustrates a method 200 for multiplying complex numbers in accordance with an embodiment of the present invention.

In method 200, at a step 202, first data is conveyed along at least a first interconnect of a processor. The first data has a first operand. The first operand represents a first complex number.

At a step 204, second data is conveyed along at least a second interconnect of the processor. The second data has a second operand. The second operand represents a second complex number.

At a step 210, the first operand is multiplied at an execution unit of the processor by the second operand to produce a first result. The first result represents a third complex number.

Figure 3:
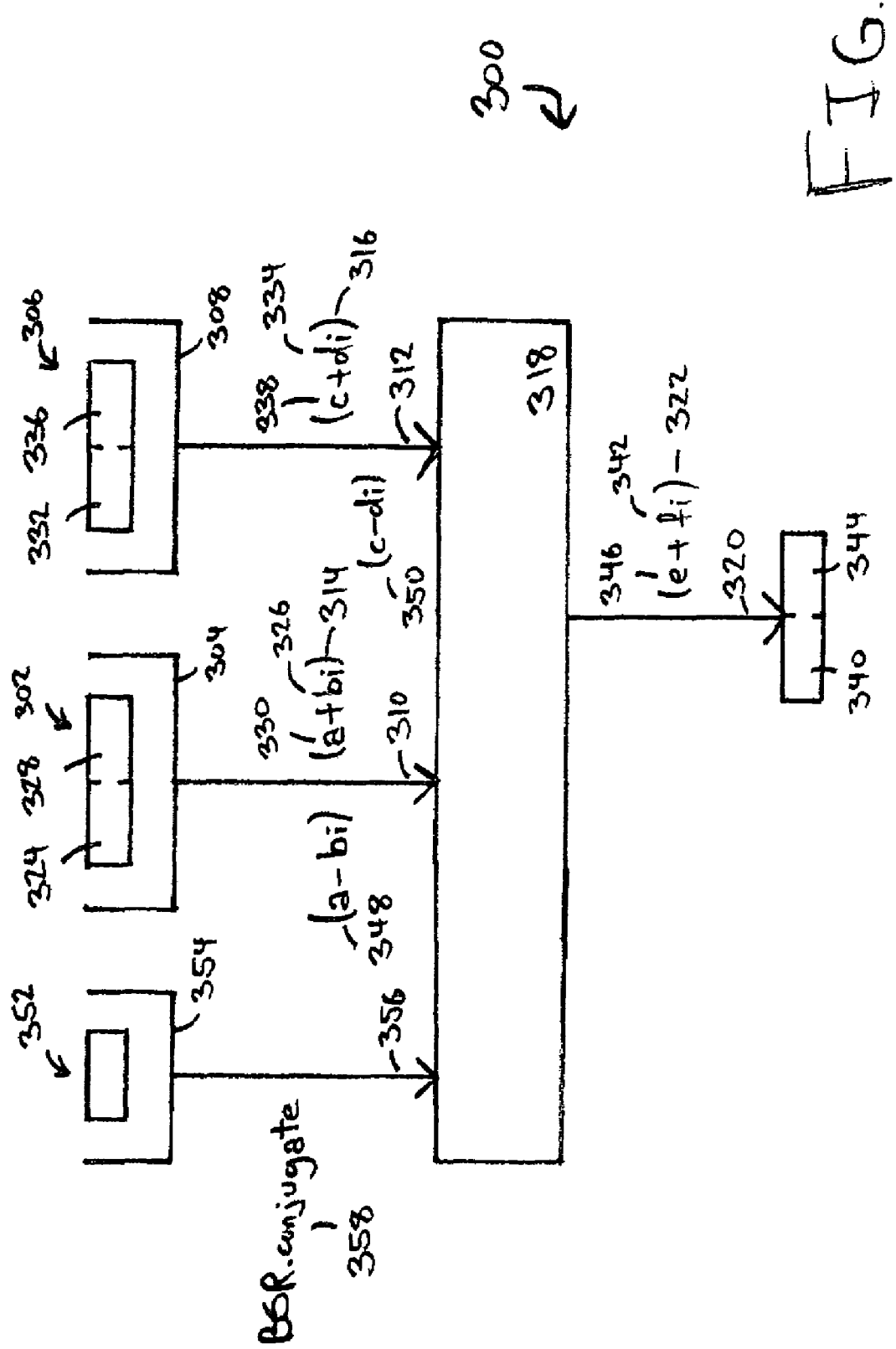
FIG. 3 illustrates an exemplary flow of data through a processor during a performance of method 200.

FIG. 3 illustrates an exemplary flow of data through a processor during a performance of method 200. First data 302 is conveyed along at least a first interconnect 304 of a processor 300. Second data 306 is conveyed along at least a second interconnect 308 of processor 300. First data 302 has a first operand 310. Second data 306 has a second operand 312. First operand 310 represents a first complex number 314. For example, first complex number 314 can be '(a+bi)'. Second operand 312 represents a second complex number 316. For example, second complex number 316 can be '(c+di)'. First operand 310 is multiplied at an execution unit 318 of processor 300 by second operand 312 to produce a first result 320. First result 320 represents a third complex number 322. For example, third complex number 322 can be '(e+fi)'.

A most significant bits portion of any operand or any result can represent either an imaginary part of the corresponding complex number or a real part of the corresponding complex number. A least significant bits portion of any operand or any result can also represent either the real part of the corresponding complex number or the imaginary part of the corresponding complex number. If the most significant bits portion represents the imaginary part, then the least significant bits portion represents the real part. If the most significant bits portion represents the real part, then the least significant bits portion represents the imaginary part. Preferably, but not necessarily, the most significant bits portion of each operand and each result represents either the imaginary part or the real part, and the least significant bits portion of each operand and each result represents the part not represented by the most significant bits portion. The imaginary part and the real part can each be represented as a two's complement signed number. Likewise, the imaginary part and the real part can each be represented as a floating point number. The skilled artisan recognizes other schemes by which the imaginary part and the real part can be represented. Therefore, the present invention is not limited to a two's complement representation scheme, a floating point number scheme, or any combination of these schemes.

For example, at FIG. 3, a most significant bits portion 324 of first operand 310 represents an imaginary part 326 of first complex number 314, a least significant bits portion 328 of first operand 310 represents a real part 330 of first complex number 314, a most significant bits portion 332 of second operand 312 represents an imaginary part 334 of second complex number 316, a least significant bits portion 336 of second operand 312 represents a real part 338 of second complex number 316, a most significant bits portion 340 of first result 320 represents an imaginary part 342 of first result 320, and a least significant bits portion 344 of first result 320 represents a real part 346 of first result 320.

Figure 4:
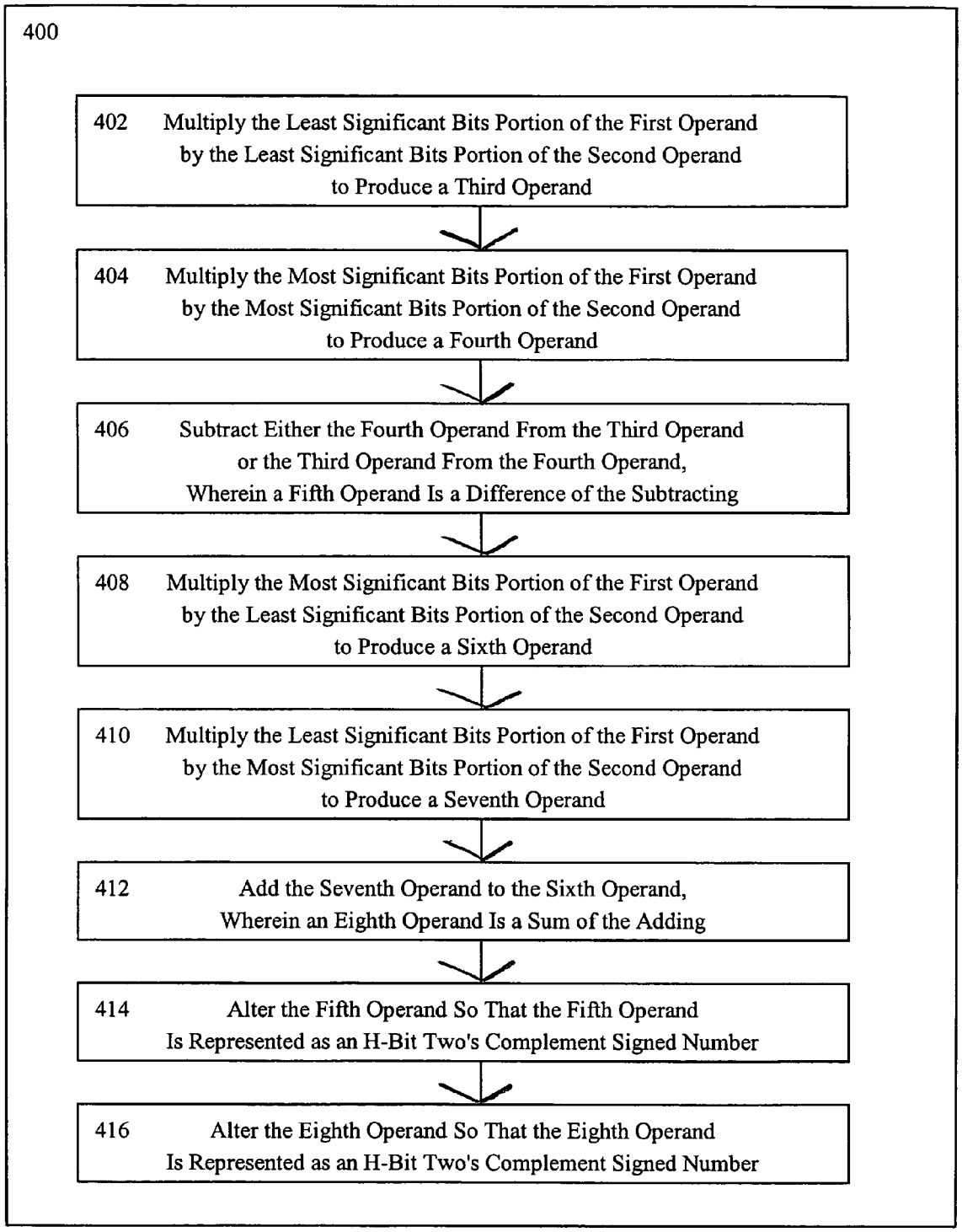
FIG. 4 is a flow chart that illustrates a method 400 for performing the multiplying at step 210 of method 200.

FIG. 4 is a flow chart that illustrates a method 400 for performing the multiplying at step 210 of method 200. In method 400, at a step 402, the least significant bits portion of the first operand is multiplied at the execution unit by the least significant bits portion of the second operand to produce a third operand. At a step 404, the most significant bits portion of the first operand is multiplied at the execution unit by the most significant bits portion of the second operand to produce a fourth operand. At a step 406, if the least significant bits portion of each of the first operand and the second operand is the real part of the corresponding complex number and the most significant bits portion of each of the first operand and the second operand is the imaginary part of the corresponding complex number, then the fourth operand is subtracted at the execution unit from the third operand. Otherwise, if the least significant bits portion of each of the first operand and the second operand is the imaginary part of the corresponding complex number and the most significant bits portion of each of the first operand and the second operand is the real part of the corresponding complex number, then the third operand is subtracted at the execution unit from the fourth operand. A fifth operand is a difference of the subtracting at step 406. At a step 408, the most significant bits portion of the first operand is multiplied at the execution unit by the least significant bits portion of the second operand to produce a sixth operand. At a step 410, the least significant bits portion of the first operand is multiplied at the execution unit by the most significant bits portion of the second operand to produce a seventh operand. At a step 412, the seventh operand is added at the execution unit to the sixth operand. An eighth operand is a sum of the adding at step 412. Advantageously, the multiplying at steps 402, 404, 408, and 410 can be performed in parallel. Advantageously, the subtracting at step 406 and the adding at step 412 can also be performed in parallel.

Figure 5:
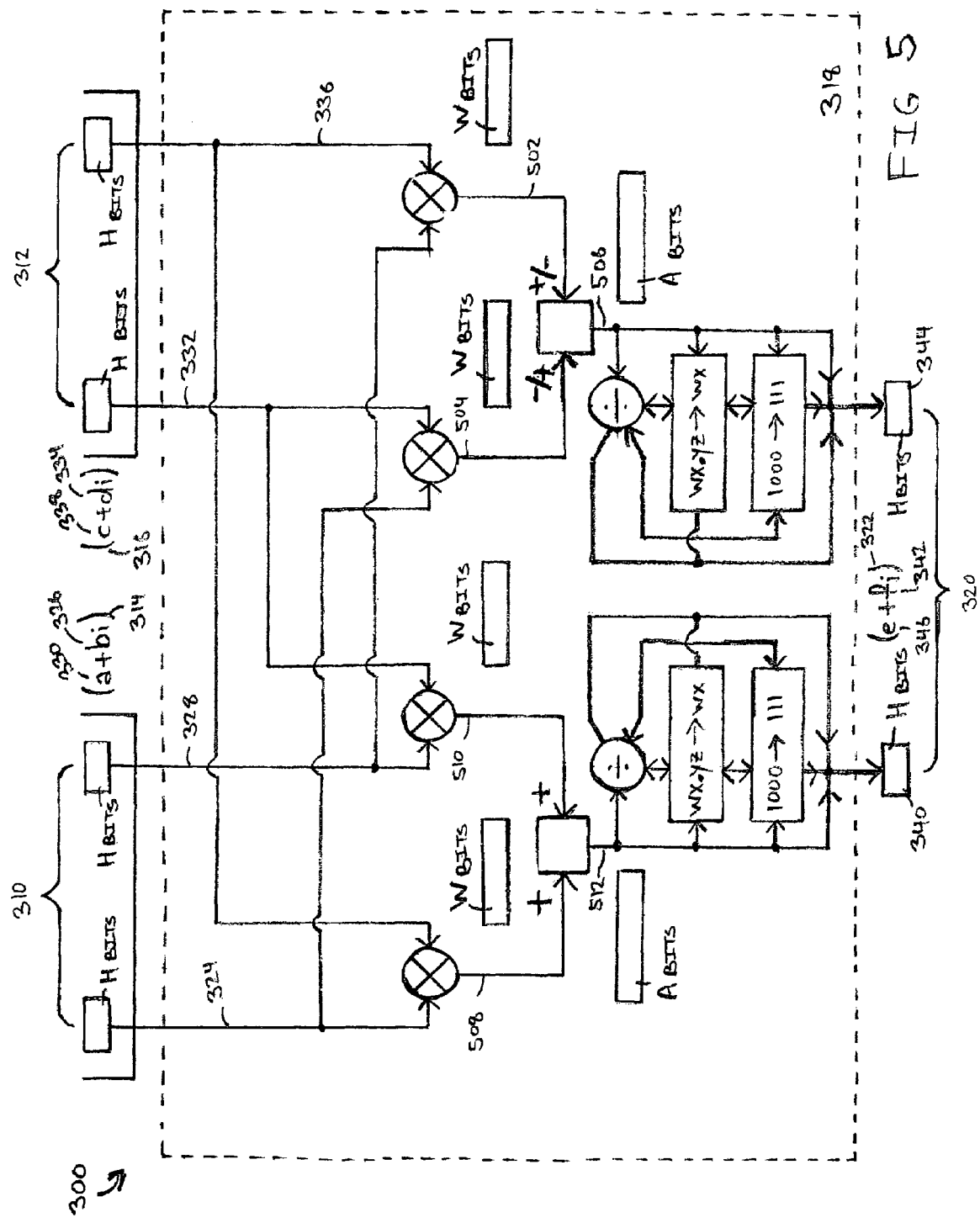
FIG. 5 illustrates an exemplary flow of data through a processor during a performance of method 400.

FIG. 5 illustrates an exemplary flow of data through a processor during a performance of method 400. Least significant bits portion 328 of first operand 310 is multiplied at execution unit 318 by least significant bits portion 336 of second operand 312 to produce a third operand 502. Most significant bits portion 324 of first operand 310 is multiplied at execution unit 318 by most significant bits portion 332 of second operand 312 to produce a fourth operand 504. Either fourth operand 504 is subtracted at execution unit 318 from third operand 502 or third operand 502 is subtracted at execution unit 318 from fourth operand 504. A fifth operand 506 is a difference of the subtracting. Most significant bits portion 324 of first operand 310 is multiplied at execution unit 318 by least significant bits portion 336 of second operand 312 to produce a sixth operand 508. Least significant bits portion 328 of first operand 310 is multiplied at execution unit 318 by most significant bits portion 332 of second operand 312 to produce a seventh operand 510. Seventh operand 510 is added at execution unit 318 to sixth operand 508. An eighth operand 512 is a sum of the adding.

As shown at FIG. 5, fifth operand 506 can be least significant bits portion 344 of first result 320 if least significant bits portion 328 of first operand 310 represents real part 330 of first complex number 314 and least significant bits portion 336 of second operand 312 represents real part 338 of second complex number 316. Alternatively, fifth operand 506 can be most significant bits portion 340 of first result 320 if most significant bits portion 324 of first operand 310 represents real part 330 of first complex number 314 and most significant bits portion 332 of second operand 312 represents real part 338 of second complex number 316. Likewise, as shown at FIG. 5, eighth operand 512 can be most significant bits portion 340 of first result 320 if least significant bits portion 328 of first operand 310 represents real part 330 of first complex number 314 and least significant bits portion 336 of second operand 312 represents real part 338 of second complex number 316. Alternatively, eighth operand 512 can be least significant bits portion 344 of first result 320 if most significant bits portion 324 of first operand 310 represents real part 330 of first complex number 314 and most significant bits portion 332 of second operand 312 represents real part 338 of second complex number 316.

Each of least significant bits portion 328 of first operand 310, most significant bits portion 324 of first operand 310, least significant bits portion 336 of second operand 312, most significant bits portion 340 of second operand 312, least significant bits portion 344 of first result 320, and most significant bits portion 340 of first result 320 can be represented as an H-bit two's complement signed number. For example, H can be equal to sixteen. Each of third operand 502, fourth operand 504, sixth operand 508, and seventh operand 510 can be represented as a W-bit two's complement signed number, wherein W equals 2H. This ensures that precision is maintained when first operand 310 is multiplied by second operand 312. For example, W can be equal to thirty-two. Each of fifth operand 506 and eighth operand 512 can be represented as an A-bit two's complement signed number, wherein A is equal to (W+1). A value of a most significant bit of the A-bit two's complement signed number indicates a sign of the A-bit two's complement signed number. This ensures that precision is maintained when fourth operand 504 is subtracted from third operand 502 and when seventh operand 510 is added to sixth operand 508. For example, A can be equal to thirty-three.

Here, in order for least significant bits portion 344 of first result 320 and most significant bits portion 340 of first result 320 each to be represented as the H-bit two's complement signed number, fifth operand 506 and eighth operand 512 must be altered. Returning to FIG. 4, at an optional step 414, the fifth operand is altered at the execution unit so that the fifth operand is represented as the H-bit two's complement signed number. At an optional step 416, the eighth operand is altered at the execution unit so that the eighth operand is represented as the H-bit two's complement signed number. The fifth operand and the eighth operand can be altered by scaling, clipping, rounding, or any combination of the foregoing.

Figure 6:
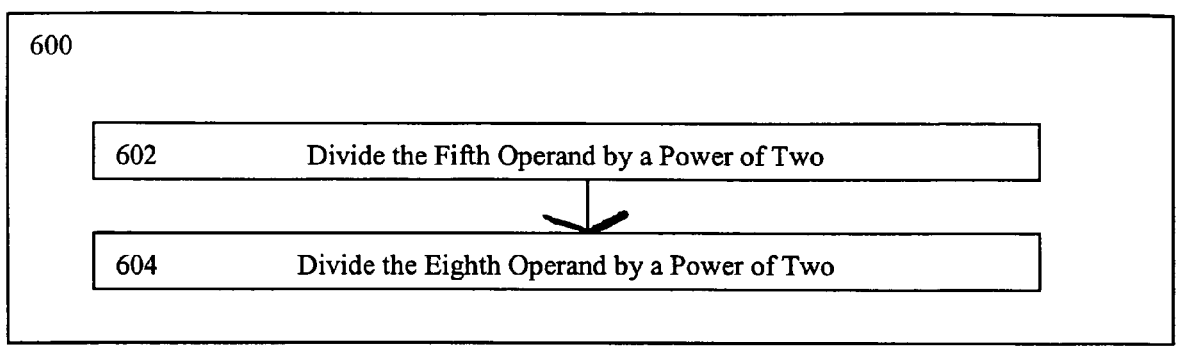
FIG. 6 is a flow chart that illustrates a method 600 for performing the altering at steps 414 and 416 of method 400.

For example, at FIG. 5, fifth operand 506 and eighth operand 512 can be altered by scaling each of fifth operand 506 and eighth operand 512. The scaling can be by a power of two, such as, for example, $[\frac{1}{2}^{(H+1)}]$. FIG. 6 is a flow chart that illustrates a method 600 for performing the altering at steps 414 and 416 of method 400. In method 600, at a step 602, the fifth operand is divided at the execution unit by a power of two, such as $2^{(H+1)}$. For example, at FIG. 5, if H equals sixteen and fifth operand 506 equals 123,904, then fifth operand 506 can be divided at execution unit 318 by 131,072 to be scaled to 0.9453125. Returning to FIG. 6, at a step 604, the eighth operand is divided at the execution unit by a power of two, such as $2^{(H+1)}$. For example, at FIG. 5, if H equals sixteen and eighth operand 512 equals 2,344,960, then eighth operand 512 can be divided at execution unit 318 by 131,072 to be scaled to 17.890625.

Figure 7:
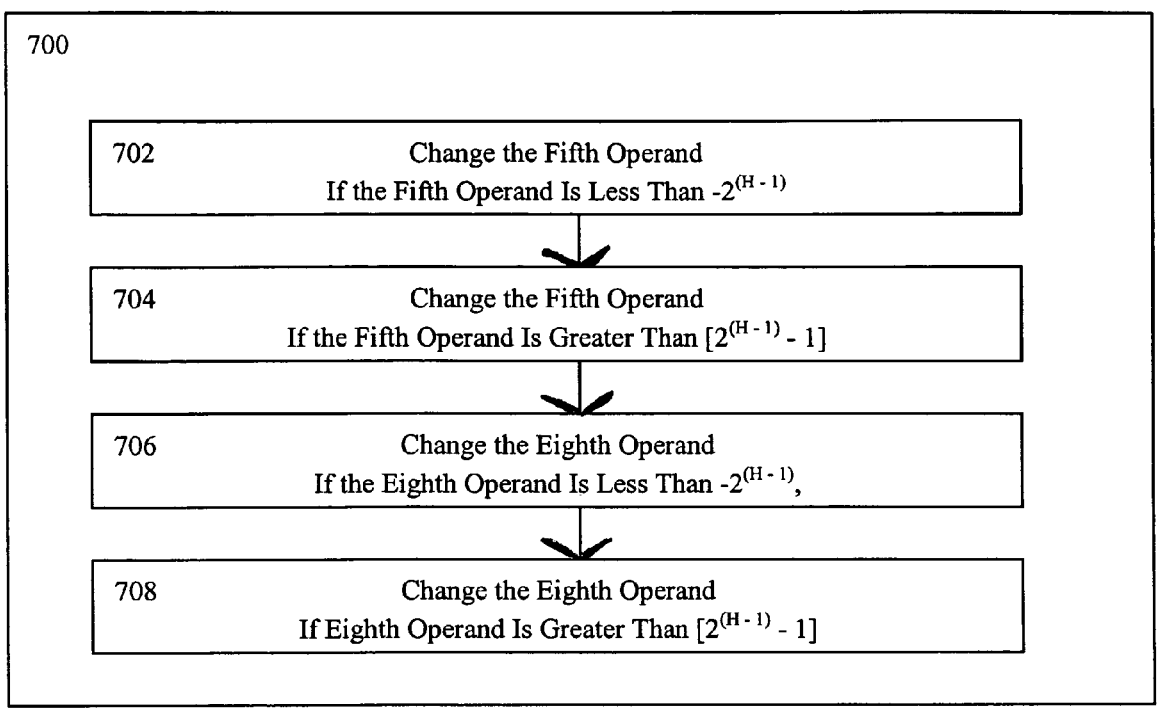
FIG. 7 is a flow chart that illustrates an alternative method 700 for performing the altering at steps 414 and 416 of method 400.

Fifth operand 506 and eighth operand 512 can also be altered by clipping each of fifth operand 506 and eighth operand 512. The clipping can be to values between, for example, $-2^{(H-1)}$ and $[2^{(H-1)}-1]$, inclusive. FIG. 7 is a flow chart that illustrates an alternative method 700 for performing the altering at steps 414 and 416 of method 400. In method 700, at a step 702, if the fifth operand is less than $-2^{(H-1)}$, then the fifth operand is changed at the execution unit to, for example, $-2^{(H-1)}$. For example, at FIG. 5, if H equals sixteen and fifth operand 506 equals −34,567, then fifth operand 506 can be changed at execution unit 318 to −32,768. Returning to FIG. 7, at a step 704, if the fifth operand is greater than $[2^{(H-1)}-1]$, then the fifth operand is changed at the execution unit to, for example, $[2^{(H-1)}-1]$. For example, at FIG. 5, if H equals sixteen and fifth operand 506 equals 34,567, then fifth operand 506 can be changed at execution unit 318 to 32,767. Returning to FIG. 7, at a step 706, if the eighth operand is less than $-2^{(H-1)}$, then the eighth operand is changed at the execution unit to, for example, $-2^{(H-1)}$. For example, at FIG. 5, if H equals sixteen and eighth operand 512 equals −4,567, then execution unit 318 does not change eighth operand 512 and it remains equal to −4,567. Returning to FIG. 7, at a step 708, if the eighth operand is greater than $[2^{(H-1)}-1]$, then the eighth operand is changed at the execution unit to, for example, $[2^{(H-1)}-1]$. For example, at FIG. 5, if H equals sixteen and eighth operand 512 equals 4,567, then execution unit 318 does not change eighth operand 512 and it remains equal to 4,567.

Figure 8:
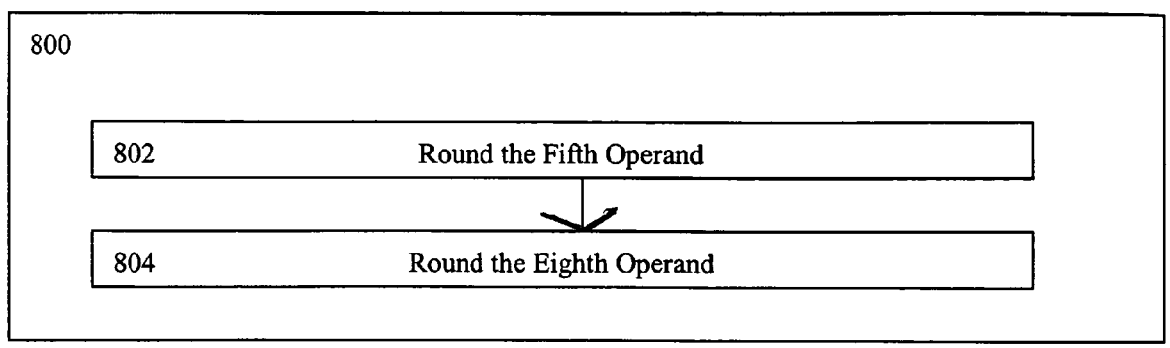
FIG. 8 is a flow chart that illustrates another alternative method 800 for performing the altering at steps 414 and 416 of method 400.

Fifth operand 506 and eighth operand 512 can also be altered by rounding each of fifth operand 506 and eighth operand 512. FIG. 8 is a flow chart that illustrates another alternative method 800 for performing the altering at steps 414 and 416 of method 400. In method 800, at a step 802, the fifth operand is rounded at the execution unit. At a step 804, the eighth operand is rounded at the execution unit.

Figure 9:
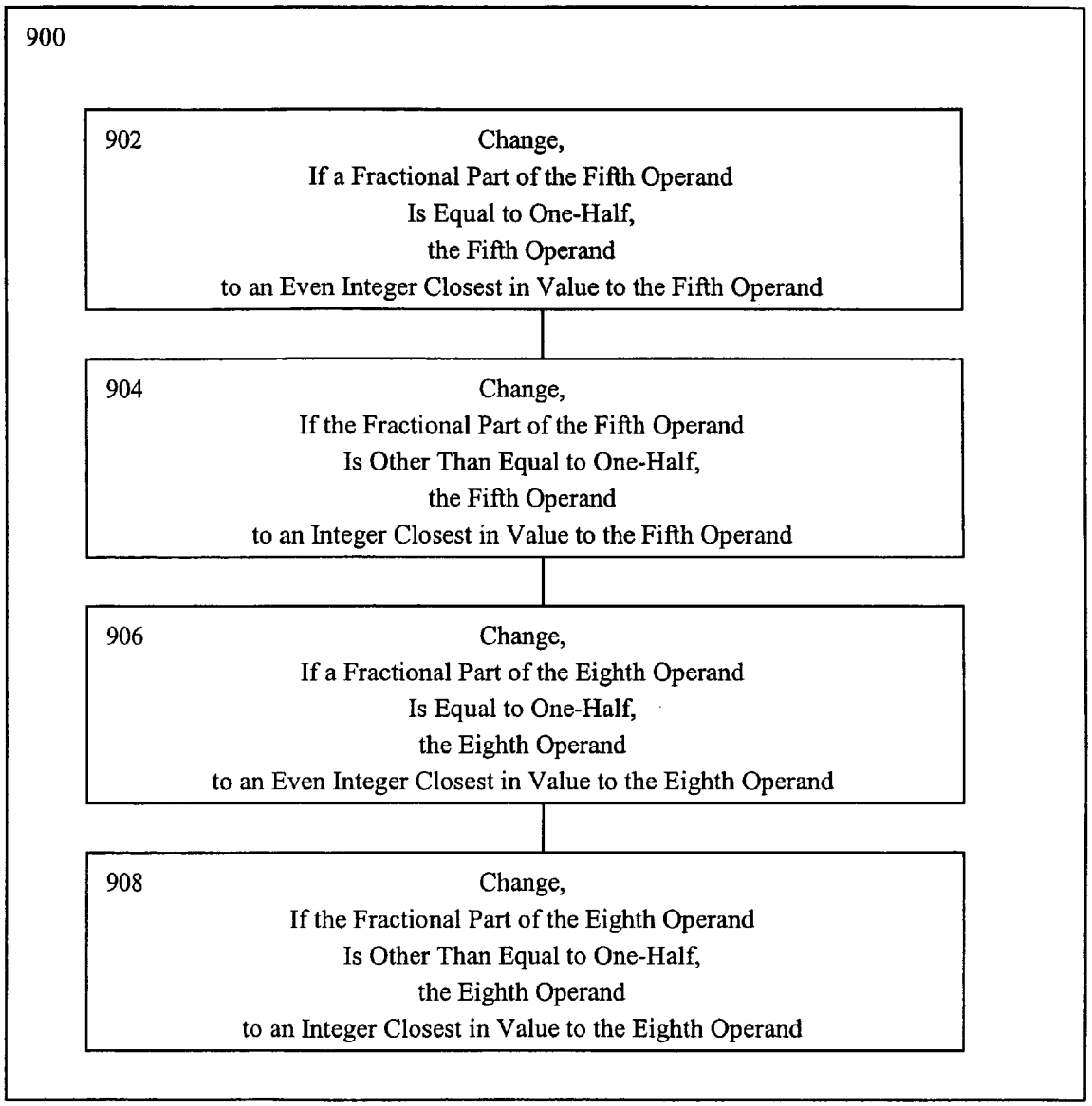
FIG. 9 is a flow chart that illustrates a method 900 for performing the rounding at steps 802 and 804 of method 800.

FIG. 9 is a flow chart that illustrates a method 900 for performing the rounding at steps 802 and 804 of method 800. In method 900, at a step 902, if a fractional part of the fifth operand is equal to one-half, then the fifth operand is changed at the execution unit to an even integer closest in value to the fifth operand. For example, at FIG. 5, if H equals sixteen and fifth operand 506 equals 9,876.5, then fifth operand 506 can be changed at execution unit 318 to 9,876. Returning to FIG. 9, at a step 904, if the fractional part of the fifth operand is not equal to one-half, then the fifth operand is changed at the execution unit to an integer closest in value to the fifth operand. For example, at FIG. 5, if H equals sixteen and fifth operand 506 equals 8,765.4, then fifth operand 506 can be changed at execution unit 318 to 8,765. Returning to FIG. 9, at a step 906, if a fractional part of the eighth operand is equal to one-half then the eighth operand is changed at the execution unit to an even integer closest in value to the eighth operand. For example, at FIG. 5, if H equals sixteen and eighth operand 512 equals 9,877.5, then eighth operand 512 can be changed at execution unit 318 to 9,878. Returning to FIG. 9, at a step 908, if the fractional part of the eighth operand is not equal to one-half, then the eighth operand is changed at the execution unit to an integer closest in value to the eighth operand. For example, at FIG. 5, if H equals sixteen and eighth operand 512 equals 8,765.6, then eighth operand 512 can be changed at execution unit 318 to 8,766.

Note that if the fractional part of an operand is equal to one-half and the least significant non-fractional digit of the operand is even, then the operand will be rounded to a lower value. If the fractional part of an operand is equal to one-half and the least significant non-fractional digit of the operand is odd, then the operand will be rounded to a higher value. When large amounts of data are processed, such a rounding scheme is statistically likely to limit distortions of values due to rounding. However, the skilled artisan recognizes other schemes by which the fifth operand and the eighth operand can be rounded. Therefore, the present invention is not limited to the rounding of method 900.

Figure 10A:
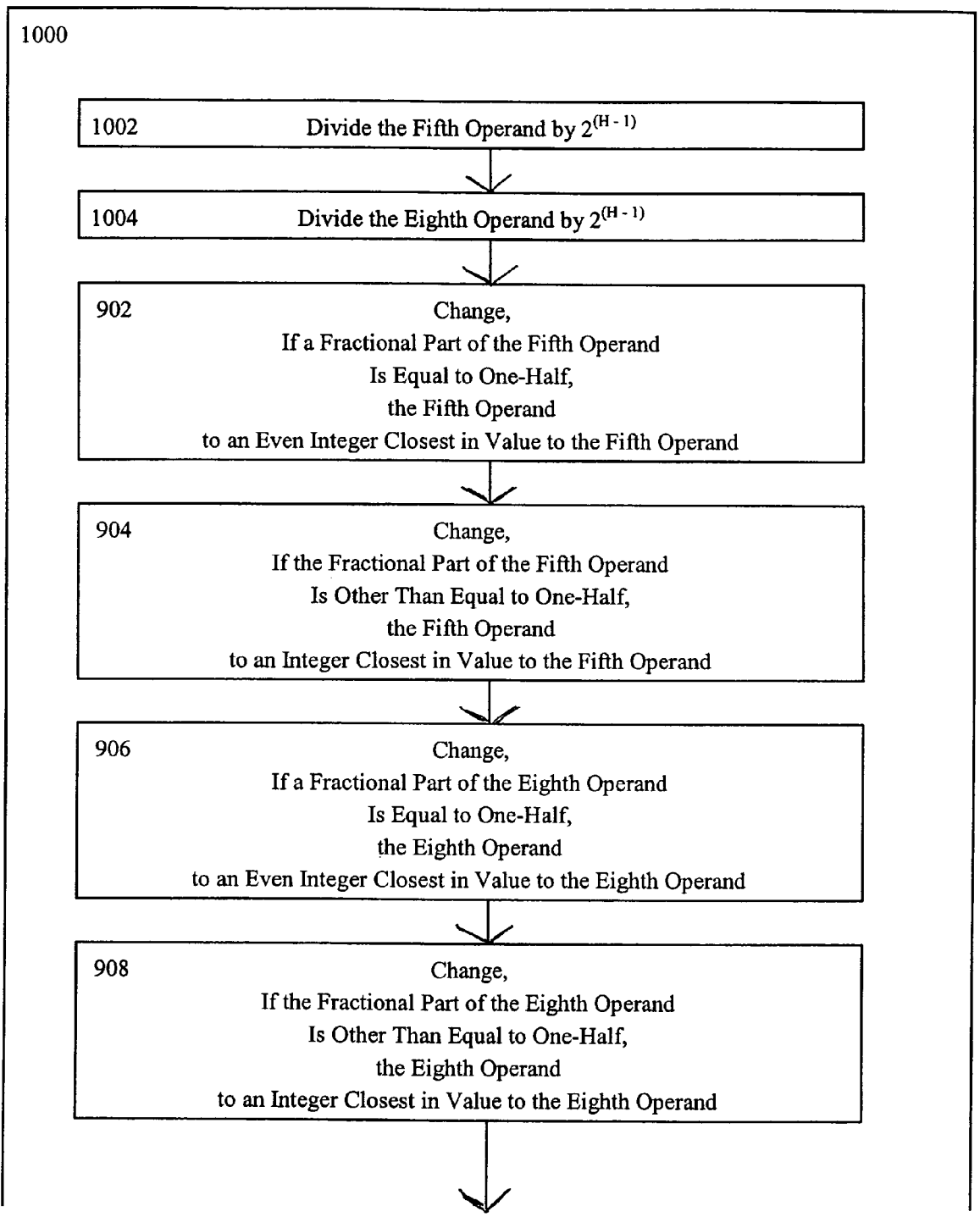
FIGS. 10A and 10B are a flow chart that illustrates yet another alternative method 1000 for performing the altering at steps 414 and 416 of method 400.
Figure 10B:
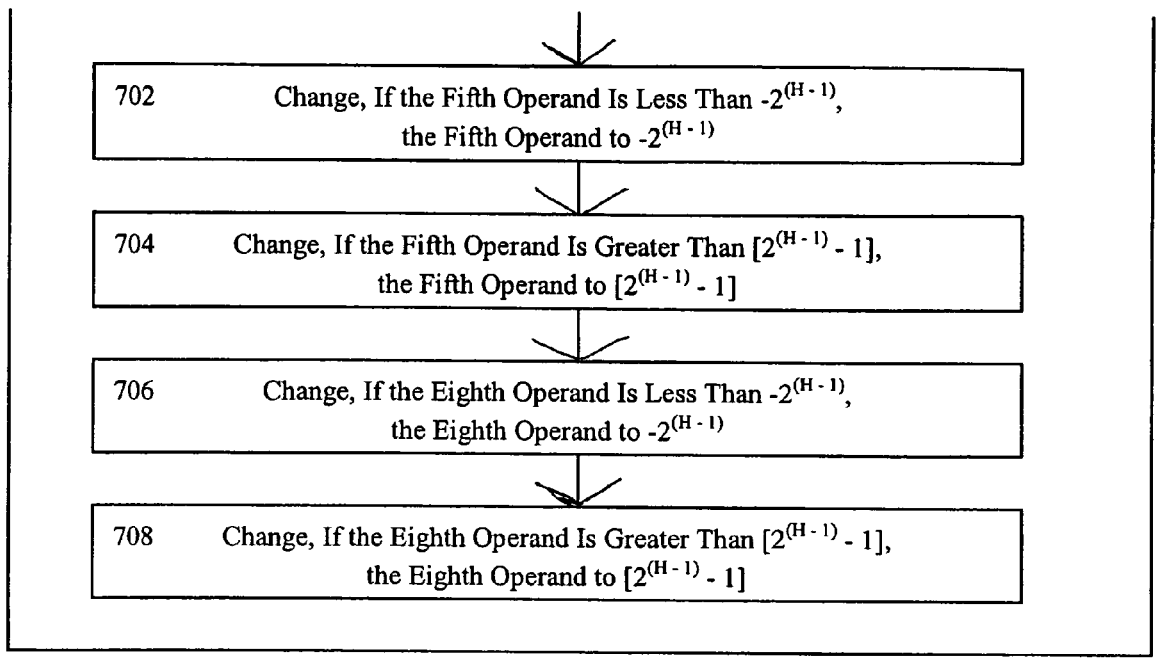

Fifth operand 506 and eighth operand 512 can also be altered by a combination of scaling, clipping, and rounding. FIGS. 10A and 10B are a flow chart that illustrates yet another alternative method 1000 for performing the altering at steps 414 and 416 of method 400. In method 1000, each of fifth operand 506 and eighth operand 512 is: (1) first, scaled by a factor of $[\frac{1}{2}^{(H-1)}]$ so that each of fifth operand 506 and eighth operand 512 is represented as a two's complement signed number having (H+2) bits for the non-fractional part and (H−1) bits for the fractional part, (2) next, rounded to an integer, which hopefully is capable of being represented as an H-bit two's complement signed number, and (3) finally, clipped if necessary so that each of fifth operand 506 and eighth operand 512 is represented as an H-bit two's complement signed number Specifically, at FIG. 10A, at a step 1002, the fifth operand is divided at the execution unit by $2^{(H-1)}$. For example, at FIG. 5, if H equals sixteen and fifth operand 506 equals 40,452,096, then fifth operand 506 can be divided at execution unit 318 by 32,768 to be scaled to 1,234.5. Returning to FIG. 10A, at a step 1004, the eighth operand is divided at the execution unit by $2^{(H-1)}$. For example, at FIG. 5, if H equals sixteen and eighth operand 512 equals 1,074,253,004, then eighth operand 512 can be divided at execution unit 318 by 32,768 to be scaled to 32,783.6.

Returning to FIG. 10A, at step 902, if a fractional part of the fifth operand is equal to one-half, then the fifth operand is changed at the execution unit to an even integer closest in value to the fifth operand. For example, at FIG. 5, if H equals sixteen and fifth operand 506 equals 1,234.5, then fifth operand 506 can be changed at execution unit 318 to 1234. Returning to FIG. 10A, at step 904, if the fractional part of the fifth operand is not equal to one-half, then the fifth operand is changed at the execution unit to an integer closest in value to the fifth operand. At step 906, if a fractional part of the eighth operand is equal to one-half, then the eighth operand is changed at the execution unit to an even integer closest in value to the eighth operand. At step 908, if the fractional part of the eighth operand is not equal to one-half, then the eighth operand is changed at the execution unit to an integer closest in value to the eighth operand. For example, at FIG. 5, if H equals sixteen and eighth operand 512 equals 32,783.6, then eighth operand 512 can be changed at execution unit 318 to 32,784.

At FIG. 10B, at step 702, if the fifth operand is less than $2^{(H-1)}$, then the fifth operand is changed at the execution unit to $-2^{(H-1)}$. At step 704, if the fifth operand is greater than $[2^{(H-1)}-1]$, then the fifth operand is changed at the execution unit to $[2^{(H-1)}-1]$. At step 706, if the eighth operand is less than $-2^{(H-1)}$, then the eighth operand is changed at the execution unit to $-2^{(H-1)}$. At step 708, if the eighth operand is greater than $[2^{(H-1)}-1]$, then the eighth operand is changed at the execution unit to $[2^{(H-1)}-1]$. For example, at FIG. 5, if H equals sixteen and eighth operand 512 equals 32,784, then eighth operand 512 can be changed at execution unit 318 to 32,767.

Returning to FIG. 2, in some applications, it can be desirable that the product of the multiplying at step 210 be equivalent to a product of multiplying one of the complex numbers by the conjugate of the other complex number or equivalent to a product of multiplying the conjugates of both complex numbers. The skilled artisan recognizes that this can be accomplished through several means such as, but not limited to: (1) altering one (or both) operand(s) so that it (they) represent a conjugate(s) of the respective complex number(s) and (2) modifying the method for performing the multiplying at step 210.

In an embodiment, causing the product of the multiplying at step 210 to be equivalent to a product of multiplying one of the complex numbers by the conjugate of the other complex number or to be equivalent to a product of multiplying the conjugates of both complex numbers can be accomplished by altering one (or both) operand(s) so that it (they) represent a conjugate(s) of the respective complex number(s). At an optional step 208, the first operand can be altered by the execution unit so that the first operand represents a conjugate of the first complex number, the second operand can be altered by the execution unit so that the second operand represents a conjugate of the second complex number, or both. For example, at FIG. 3, first operand 310 can be altered by execution unit 318 so that first operand 310 represents a conjugate 348 of first complex number 314, second operand 312 can be altered by execution unit 318 so that second operand 312 represents a conjugate 350 of second complex number 316, or both. For example, conjugate 348 of first complex number 314 can be '(a−bi)' and conjugate 350 of second complex number 316 can be '(c−di)'.

Returning to FIG. 2, at an optional step 206, third data is conveyed along at least a third interconnect of the processor. The third data has a ninth operand. The ninth operand represents a signal. The signal causes the processor to perform the altering at step 208. For example, at FIG. 3, third data 352 is conveyed along at least third interconnect 354 of processor 300. Third data 352 has a ninth operand 356. Ninth operand 356 represents a signal 358. For example, signal 358 can be 'BSR.conjugate'. If BSR.conjugate equals one, for example, then execution unit 318 performs the altering; alternatively, if BSR.conjugate equals zero, for example, then execution unit 318 does not perform the altering.

Returning to FIG. 2, in another embodiment, causing the product of the multiplying at step 210 to be equivalent to a product of multiplying one of the complex numbers by the conjugate of the other complex number can be accomplished by modifying the method for performing the multiplying at step 210. Having BSR.conjugate, the signal optionally conveyed at step 206, equal to zero can cause the execution unit to perform the multiplying at step 210 according to method 400 (or an equivalent). Alternatively, having BSR.conjugate equal to one can cause the execution unit to perform the multiplying at step 210 according to a method 1100 (or an equivalent) as described below.

Figure 11:
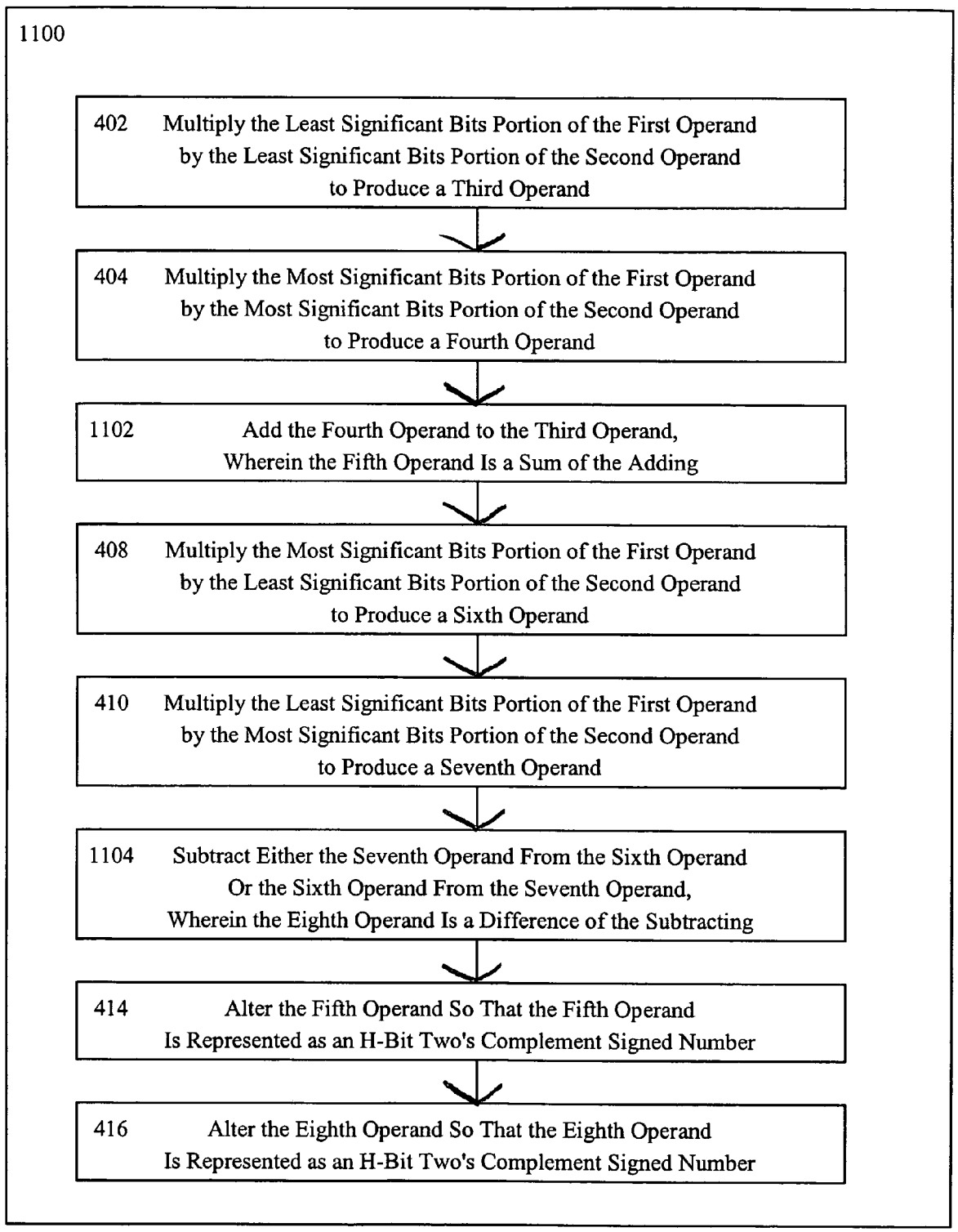
FIG. 11 is a flow chart that illustrates an alternative method 1100 for performing the multiplying at step 210 of method 200.

FIG. 11 is a flow chart that illustrates an alternative method 1100 for performing the multiplying at step 210 of method 200. In method 1100, at step 402, the least significant bits portion of the first operand is multiplied at the execution unit by the least significant bits portion of the second operand to produce the third operand. At step 404, the most significant bits portion of the first operand is multiplied at the execution unit by the most significant bits portion of the second operand to produce the fourth operand. At a step 1102, the fourth operand is added at the execution unit to the third operand. The fifth operand is a sum of the adding at step 1102. At step 408, the most significant bits portion of the first operand is multiplied at the execution unit by the least significant bits portion of the second operand to produce the sixth operand. At step 410, the least significant bits portion of the first operand is multiplied at the execution unit by the most significant bits portion of the second operand to produce the seventh operand. At a step 1104, if the least significant bits portion of each of the first operand and the second operand is the real part of the corresponding complex number and the most significant bits portion of each of the first operand and the second operand is the imaginary part of the corresponding complex number, then the seventh operand is subtracted at the execution unit from the sixth operand. Otherwise, if the least significant bits portion of each of the first operand and the second operand is the imaginary part of the corresponding complex number and the most significant bits portion of each of the first operand and the second operand is the real part of the corresponding complex number, then the sixth operand is subtracted at the execution unit from the seventh operand. The eighth operand is a difference of the subtracting at step 1104. Advantageously, the multiplying at steps 402, 404, 408, and 410 can be performed in parallel. Advantageously, the adding at step 1102 and the subtracting at step 1104 can also be performed in parallel.

At optional step 414, the fifth operand is altered at the execution unit so that the fifth operand is represented as an H-bit two's complement signed number. At optional step 416, the eighth operand is altered at the execution unit so that the eighth operand is represented as an H-bit two's complement signed number. As explained above, the fifth operand and the eighth operand can be altered by scaling, clipping, rounding, or any combination of the foregoing.

Figure 12:
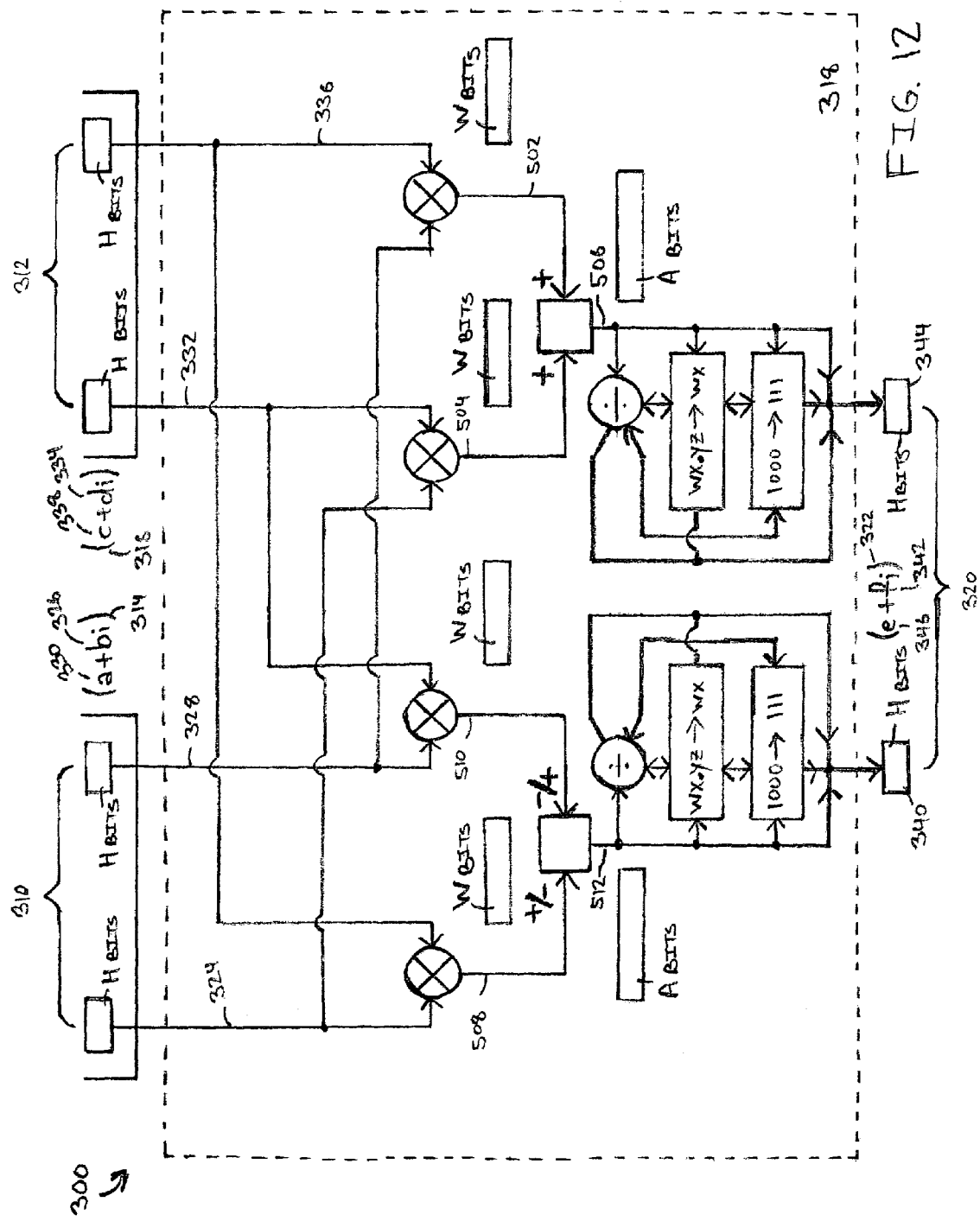
FIG. 12 illustrates an exemplary flow of data through a processor during a performance of method 1100.

FIG. 12 illustrates an exemplary flow of data through a processor during a performance of method 1100. Least significant bits portion 328 of first operand 310 is multiplied at execution unit 318 by least significant bits portion 336 of second operand 312 to produce third operand 502. Most significant bits portion 324 of first operand 310 is multiplied at execution unit 318 by most significant bits portion 332 of second operand 312 to produce fourth operand 504. Fourth operand 504 is added at execution unit 318 to third operand 502. Fifth operand 506 is a sum of the adding. Most significant bits portion 324 of first operand 310 is multiplied at execution unit 318 by least significant bits portion 336 of second operand 312 to produce sixth operand 508. Least significant bits portion 328 of first operand 310 is multiplied at execution unit 318 by most significant bits portion 332 of second operand 312 to produce seventh operand 510. Either seventh operand 510 is subtracted at execution unit 318 from sixth operand 508 or sixth operand 508 is subtracted at execution unit 318 from seventh operand 510.

The present invention can also be extended so that a single instruction causes multiplication operations to be performed on additional pairs of complex numbers. Returning to FIG. 2, in addition to the first operand, the first data can also have a tenth operand. The tenth operand can represent a fourth complex number. In addition to the second operand, the second data can also have an eleventh operand. The eleventh operand can represent a fifth complex number. In such an embodiment, at a step 212, the tenth operand is multiplied at the execution unit by the eleventh operand to produce a second result. The second result represents a sixth complex number. Advantageously, multiplying the first operand by the second operand can be performed in parallel with multiplying the tenth operand by the eleventh operand.

The skilled artisan recognizes that the other features of the present invention described above with regards to multiplication operations performed on a single pair of complex numbers also apply to embodiments in which multiplication operations are performed on multiple pairs of complex numbers. Therefore, the present invention also encompasses multiplication operations that include the other features described above and are performed on multiple pairs of complex numbers.

Figure 13:
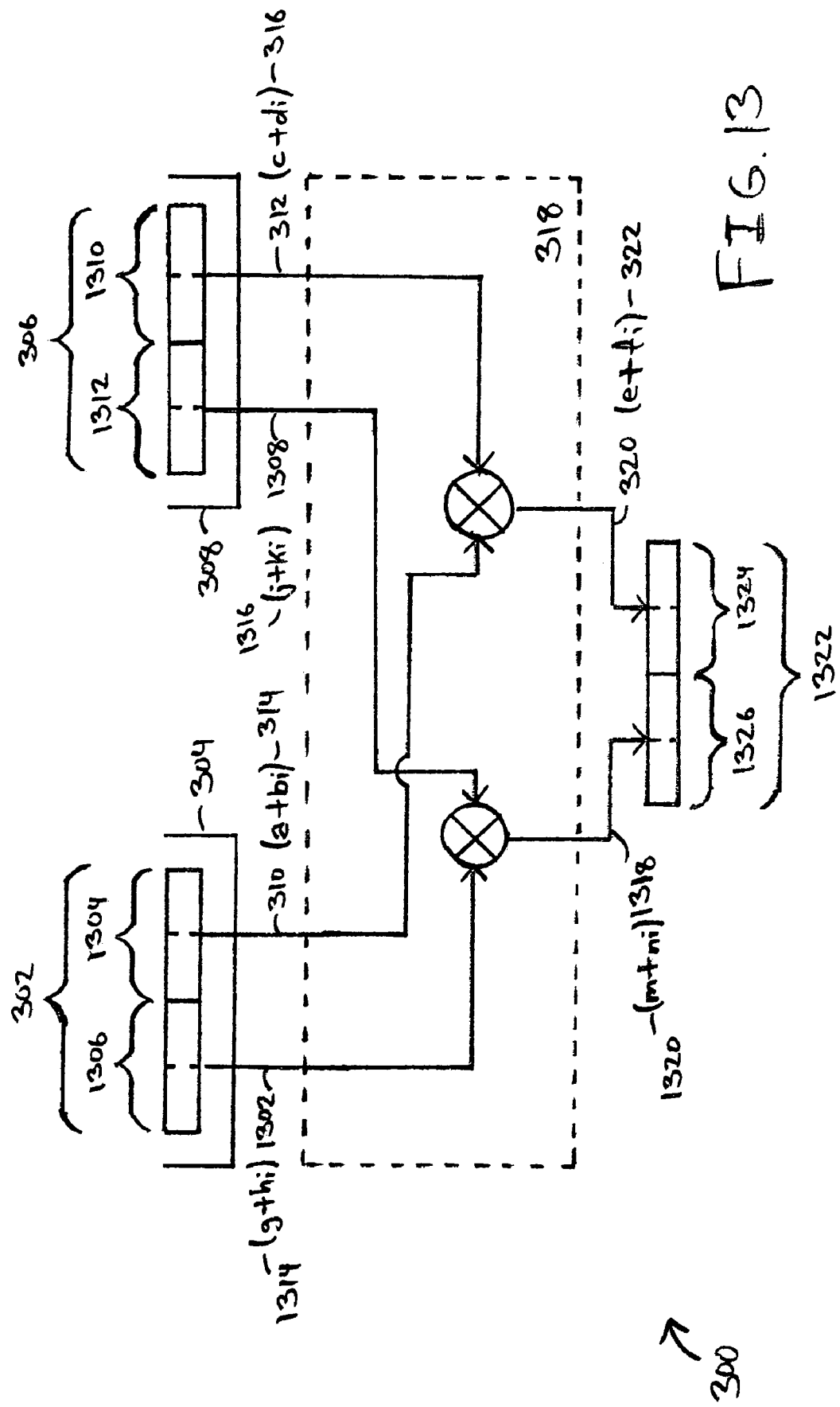
FIG. 13 illustrates an exemplary flow of multiple operand data through a processor during a performance of method 200.

FIG. 13 illustrates an exemplary flow of multiple operand data through a processor during a performance of method 200. First data 302 is conveyed along at least first interconnect 304. First data 302 has first operand 310 and a tenth operand 1302. First operand 310 is, for example, a least significant bits portion 1304 of first data 302. Tenth operand 1302 is, for example, a most significant bits portion 1306 of first data 302. Second data 306 is conveyed along at least second interconnect 308. Second data 306 has second operand 312 and an eleventh operand 1308. Second operand 312 is, for example, a least significant bits portion 1310 of second data 306. Eleventh operand 1308 is, for example, a most significant bits portion 1312 of second data 306. First operand 310 represents first complex number 314. For example, first complex number 314 can be '(a+bi)'. Second operand 312 represents second complex number 316. For example, second complex number 316 can be '(c+di)'. Tenth operand 1302 represents a fourth complex number 1314. For example, fourth complex number 1314 can be '(g+hi)'. Eleventh operand 1308 represents a fifth complex number 1316. For example, fifth complex number 1316 can be '(j+ki)'.

First operand 310 is multiplied at execution unit 318 by second operand 312 to produce first result 320. First result 320 represents third complex number 322. For example, third complex number 322 can be '(e+fi)'. Tenth operand 1302 is multiplied at execution unit 318 by eleventh operand 1308 to produce a second result 1318. Second result 1318 represents a sixth complex number 1320. For example, sixth complex number 1320 can be '(m+ni)'. First result 320 and second result 1318 are fourth data 1322. First result 320 is, for example, a least significant bits portion 1324 of fourth data 1322. Second result 1318 is, for example, a most significant bits portion 1326 of fourth data 1322.

Figure 14:
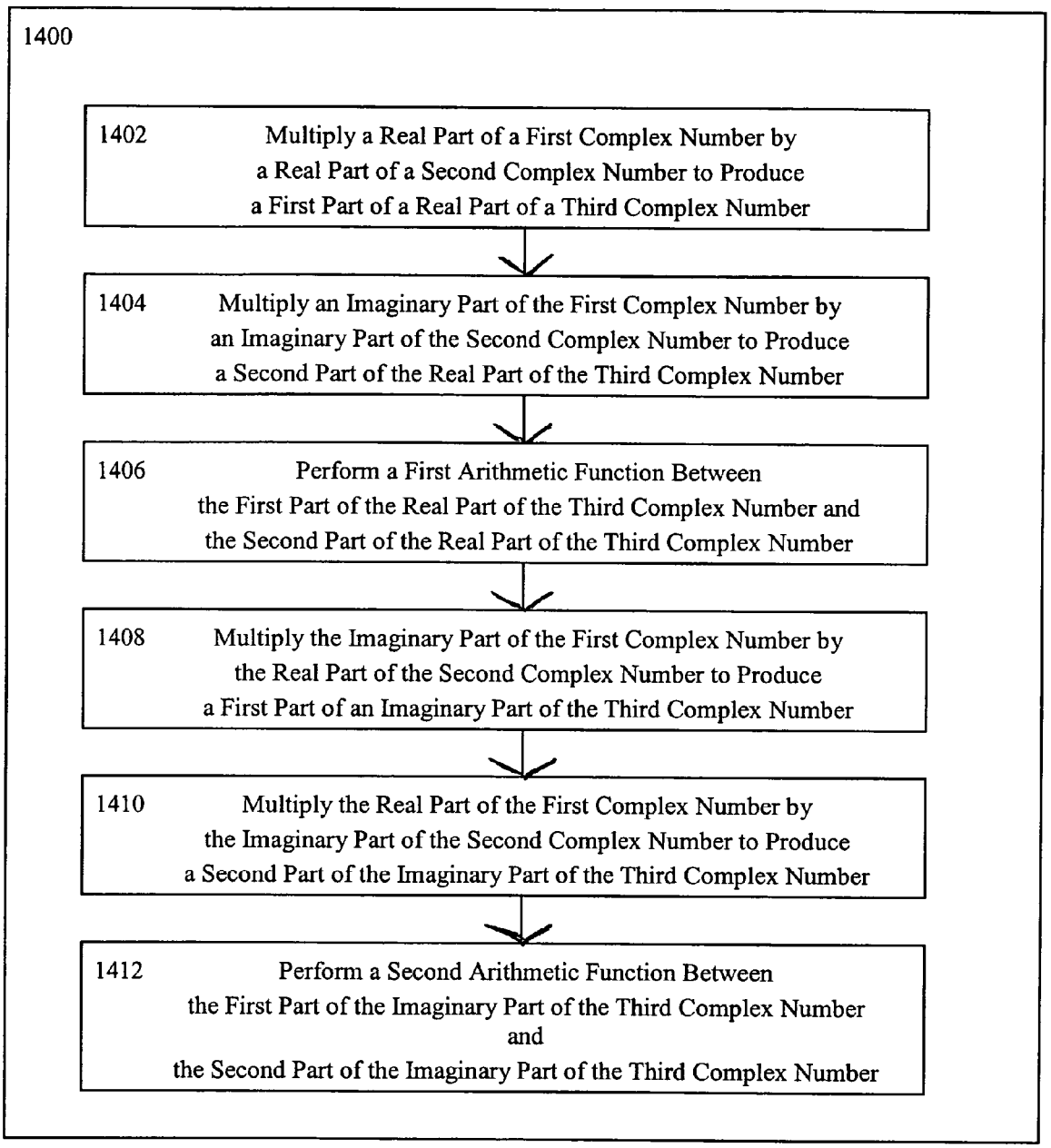
FIG. 14 is a flow chart that illustrates a method 1400 for multiplying complex numbers in accordance with an alternative embodiment of the present invention.

FIG. 14 is a flow chart that illustrates a method 1400 for multiplying complex numbers in accordance with an alternative embodiment of the present invention. In method 1400, at a step 1402, a real part of a first complex number is multiplied at an execution unit of a processor by a real part of a second complex number to produce a first part of a real part of a third complex number. At a step 1404, an imaginary part of the first complex number is multiplied at the execution unit by an imaginary part of the second complex number to produce a second part of the real part of the third complex number. At a step 1406, a first arithmetic function is performed at the execution unit between the first part of the real part of the third complex number and the second part of the real part of the third complex number. At a step 1408, the imaginary part of the first complex number is multiplied at the execution unit by the real part of the second complex number to produce a first part of an imaginary part of the third complex number. At a step 1410, the real part of the first complex number is multiplied at the execution unit by the imaginary part of the second complex number to produce a second part of the imaginary part of the third complex number. At a step 1412, a second arithmetic function is performed at the execution unit between the first part of the imaginary part of the third complex number and the second part of the imaginary part of the third complex number. The multiplying at steps 1402, 1404, 1408, and 1410 is performed in parallel.

In an embodiment, the first arithmetic function is subtracting the second part of the real part of the third complex number from the first part of the real part of the third complex number and the second arithmetic function is adding the second part of the imaginary part of the third complex number to the first part of the imaginary part of the third complex number. In another embodiment, the first arithmetic function is adding the second part of the real part of the third complex number to the first part of the real part of the third complex number and the second arithmetic function is subtracting the second part of the imaginary part of the third complex number from the first part of the imaginary part of the third complex number. In both embodiments, the first arithmetic function and the second arithmetic function can be performed in parallel.

Figure 15:
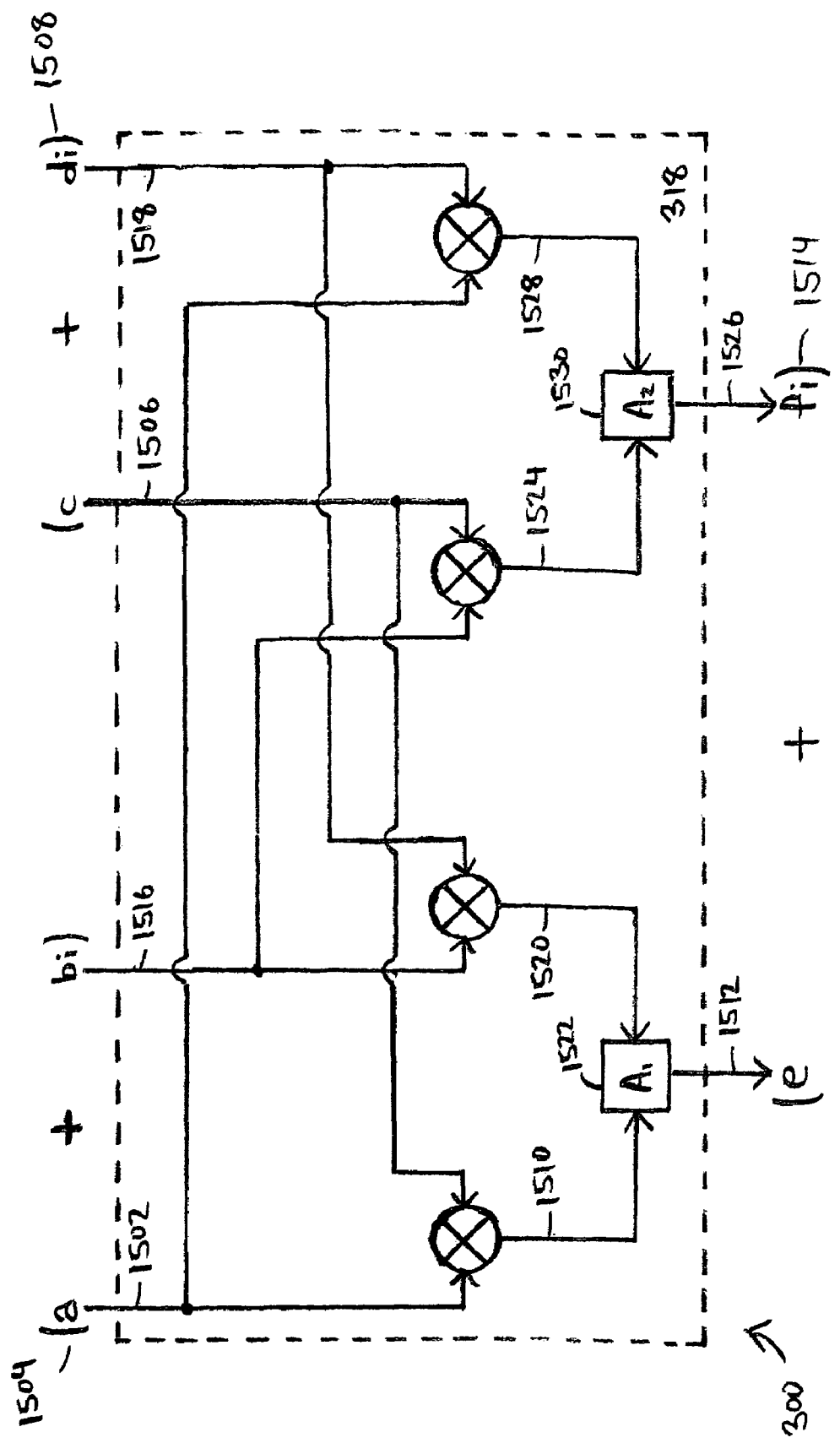
FIG. 15 illustrates an exemplary flow of data through a processor during a performance of method 1400.

FIG. 15 illustrates an exemplary flow of data through a processor during a performance of method 1400. A real part 1502 of a first complex number 1504 is multiplied at execution unit 318 by a real part 1506 of a second complex number 1508 to produce a first part 1510 of a real part 1512 of a third complex number 1514. An imaginary part 1516 of first complex number 1504 is multiplied at execution unit 318 by an imaginary part 1518 of second complex number 1508 to produce a second part 1520 of real part 1512 of third complex number 1514. A first arithmetic function 1522 is performed at execution unit 318 between first part 1510 of real part 1512 of third complex number 1514 and second part 1520 of real part 1512 of third complex number 1514. Imaginary part 1516 of first complex number 1504 is multiplied at execution unit 318 by real part 1506 of second complex number 1508 to produce a first part 1524 of an imaginary part 1526 of third complex number 1514. Real part 1502 of first complex number 1504 is multiplied at execution unit 318 by imaginary part 1518 of second complex number 1508 to produce a second part 1528 of imaginary part 1526 of third complex number 1514. A second arithmetic function 1530 is performed at execution unit 318 between first part 1524 of imaginary part 1526 of third complex number 1514 and second part 1528 of imaginary part 1526 of third complex number 1514.

Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for multiplying complex numbers, comprising:
   a first register configured to store first data having a first operand, the first operand representing a first complex number;
   a second register configured to store second data having a second operand, the second operand representing a second complex number;
   a processor configured to perform: a multiplication of the first operand by the second operand to produce a first result, the first result representing a third complex number, a rounding operation of the first result to produce a second result, and a saturating operation of the second result to produce a third result that is within a range of numbers; and
   a third register configured to store the third result.

2. The system of claim 1, wherein a most significant bits portion of each of the first operand, the second operand, the first result, the second result, and the third result represents one of an imaginary part of a corresponding complex number and a real part of the corresponding complex number and a least significant bits portion of each of the first operand, the second operand, the first result, the second result, and the third result represents one of the real part of the corresponding complex number and the imaginary part of the corresponding complex number, if the most significant bits portion represents the imaginary part, then the least significant bits portion represents the real part, and if the most significant bits portion represents the real part, then the least significant bits portion represents the imaginary part.

3. The system of claim 2, wherein the imaginary part and the real part are each represented as a two's complement signed number.

4. The system of claim 2, wherein the imaginary part and the real part are each represented as a floating point number.

5. The system of claim 2, wherein multiplication comprises:
   a first multiplication of the least significant bits portion of the first operand by the least significant bits portion of the second operand to produce a third operand;
   a second multiplication of the most significant bits portion of the first operand by the most significant bits portion of the second operand to produce a fourth operand;
   a subtraction of one of the fourth operand from the third operand if the least significant bits portion of each of the first operand and the second operand represents the real part of the corresponding complex number and the most significant bits portion of each of the first operand and the second operand represents the imaginary part of the corresponding complex number, and the third operand from the fourth operand if the least significant bits portion of each of the first operand and the second operand represents the imaginary part of the corresponding complex number and the most significant bits portion of each of the first operand and the second operand represents the real part of the corresponding complex number, wherein a fifth operand is a difference of the subtraction;
   a third multiplication of the most significant bits portion of the first operand by the least significant bits portion of the second operand to produce a sixth operand;
   a fourth multiplication of the least significant bits portion of the first operand by the most significant bits portion of the second operand to produce a seventh operand; and
   an addition of the seventh operand to the sixth operand, wherein an eighth operand is a sum of the addition.

6. The system of claim 5, wherein the first multiplication, the second multiplication, the third multiplication, and the fourth multiplication are performed in parallel.

7. The system of claim 5, wherein the subtraction and the addition are performed in parallel.

8. The system of claim 5, wherein:
   the fifth operand is one of the least significant bits portion of the first result if the least significant bits portion of each of the first operand and the second operand represents the real part of the corresponding complex number and the most significant bits portion of each of the first operand and the second operand represents the imaginary part of the corresponding complex number, and the most significant bits portion of the first result if the most significant bits portion of each of the first operand and the second operand represents the real part of the corresponding complex number and the least significant bits portion of each of the first operand and the second operand represents the imaginary part of the corresponding complex number; and
   the eighth operand is one of the most significant bits portion of the first result if the least significant bits portion of each of the first operand and the second operand represents the real part of the corresponding complex number and the most significant bits portion of each of the first operand and the second operand represents the imaginary part of the corresponding complex number, and the least significant bits portion of the first result if the most significant bits portion of each of the first operand and the second operand represents the real part of the corresponding complex number and the least significant bits portion of each of the first operand and the second operand represents the imaginary part of the corresponding complex number.

9. The system of claim 5, wherein each of the least significant bits portion of the first operand, the most significant bits portion of the first operand, the least significant bits portion of the second operand, the most significant bits portion of the second operand, the least significant bits portion of the first result, and the most significant bits portion of the first result is represented as an H-bit two's complement signed number.

10. The system of claim 9, wherein each of the third operand, the fourth operand, the sixth operand, and the seventh operand is represented as a W-bit two's complement signed number, wherein W equals 2H.

11. The system of claim 10, wherein each of the fifth operand and the eighth operand is represented as an A-bit two's complement signed number, wherein A is equal to (W+1) and a value of a most significant bit of the A-bit two's complement signed number indicates a sign of the A-bit two's complement signed number.

12. The system of claim 11, wherein the rounding operation comprises:

a first alteration of the fifth operand so that the fifth operand is represented as the H-bit two's complement signed number; and a second alteration of the eighth operand so that the eighth operand is represented as the H-bit two's complement signed number.

13. The method system of claim 12, wherein the first alteration and the second alteration comprise:

a first division of the fifth operand by a power of two; and a second division of the eighth operand by the power of two.

14. The system of claim 13, wherein the power of two is $2^{(H+1)}$.

15. The system of claim 12, wherein the first alteration and the second alteration comprise:

a first operation to change the fifth operand if the fifth operand is less than $-2^{(H-1)}$;

a second operation to change the fifth operand if the fifth operand is greater than $[2^{(H-1)}-1]$;

a third operation to change the eighth operand if the eighth operand is less than $-2^{(H-1)}$; and a fourth operation to change the eighth operand if the eighth operand is greater than $[2^{(H-1)}-1]$.

16. The system of claim 15, wherein the first operation to change, the second operation to change, the third operation to change. and the fourth operation to change comprise:

a fifth operation to change, if the fifth operand is less than $-2^{(H-1)}$, the fifth operand to $-2^{(H-1)}$;

a sixth operation to change, if the fifth operand is greater than $[2^{(H-1)}-1]$, the fifth operand to $[2^{(H-1)}-1]$;

a seventh operation to change, if the eighth operand is less than $-2^{(H-1)}$, the eighth operand to $-2^{(H-1)}$; and an eighth operation to change, if the eighth operand is greater than $[2^{(H-1)}-1]$, the eighth operand to $[2^{(H-1)}-1]$.

17. The system of claim 12, wherein the first alteration and the second alteration comprise:

a first rounding operation for the fifth operand; and a second rounding operation for the eighth operand.

18. The system of claim 17, wherein the first rounding operation and the second rounding operation comprise:

a first operation to change, if a fractional part of the fifth operand is equal to one-half the fifth operand to an even integer closest in value to the fifth operand;

a second operation to change, if the fractional part of the fifth operand is other than equal to one-half the fifth operand to an integer closest in value to the fifth operand;

a third operation to change, if a fractional part of the eighth operand is equal to one-half the eighth operand to an even integer closest in value to the eighth operand; and a fourth operation to change, if the fractional part of the eighth operand is other than equal to one-half, the eighth operand to an integer closest in value to the eighth operand.

19. The system of claim 18, wherein the first rounding operation and the second rounding operation further comprise, before the first operation to change, the second operation to change. the third operation to change, and the fourth operation to change:

a first division of the fifth operand by $2^{(H-1)}$; and a second division of the eighth operand by $2^{(H-1)}$.

20. The system of claim 19, wherein the first rounding operation and the second rounding operation further comprise, after the first operation to change, the second operation to change, the third operation to change, and the fourth operation to change:

a fifth operation to change, if the fifth operand is less than $-2^{(H-1)}$, the fifth operand to $-2^{(H-1)}$;

a sixth operation to change, if the fifth operand is greater than $[2^{(H-1)}-1]$, the fifth operand to $[2^{(H-1)}-1]$;

a seventh operation to change, if the eighth operand is less than $-2^{(H-1)}$, the eighth operand to $-2^{(H-1)}$; and an eighth operation to change, if the eighth operand is greater than $[2^{(H-1)}-1]$, the eighth operand to $[2^{(H-1)}-1]$.

21. The system of claim 5, wherein the processor is further configured to receive third data having a ninth operand, the ninth operand representing a signal that causes the processor to perform the multiplication of the first operand by the second operand.

22. The system of claim 2, wherein the multiplication comprises:

a first multiplication of the least significant bits portion of the first operand by the least significant bits portion of the second operand to produce a third operand;

a second multiplication of the most significant bits portion of the first operand by the most significant bits portion of the second operand to produce a fourth operand;

an addition of the fourth operand to the third operand, wherein a fifth operand is a sum of the addition:

a third multiplication of the most significant bits portion of the first operand by the least significant bits portion of the second operand to produce a sixth operand;

a fourth multiplication of the least significant bits portion of the first operand by the most significant bits portion of the second operand to produce a seventh operand; and a subtraction of one of the seventh operand from the sixth operand if the least significant bits portion of each of the first operand and the second operand represents the real part of the corresponding complex number and the most significant bits portion of each of the first operand and the second operand represents the imaginary part of the corresponding complex number, and the sixth operand from the seventh operand if the least significant bits portion of each of the first operand and the second operand represents the imaginary part of the corresponding complex number and the most significant bits portion of each of the first operand and the second operand represents the real part of the corresponding complex number, wherein an eighth operand is a difference of the subtraction.

23. The system of claim 22, wherein the first multiplication, the second multiplication, the third multiplication, and the fourth multiplication are performed in parallel.

24. The system of claim 22, wherein the addition and the subtracting step the subtraction are performed in parallel.

25. The system of claim 22, wherein the rounding operation comprises:

a first alteration of the fifth operand so that the fifth operand is represented as an H-bit two's complement signed number; and a second alteration of the eighth operand so that the eighth operand is represented as the H-bit two's complement signed number.

26. The system of claim 22, wherein the processor is further configured to receive third data having a ninth operand, the ninth operand representing a signal that causes the processor to perform the multiplication of the first operand by the second operand.

27. The system of claim 1, wherein the processor is further configured to perform an alteration of at least one of the first operand and the second operand so that the at least one of the first operand and the second operand represents a conjugate of at least one of the first complex number and the second complex number.

28. The system of claim 27, wherein the processor is further configured to receive
third data having a third operand, the third operand representing a signal that causes the processor to perform the alteration.

29. The system of claim 1, wherein the first data has a third operand, the third operand representing a fourth complex number, the second data has a fourth operand, the fourth operand representing a fifth complex number, and the processor is further configured to perform a multiplication of
the third operand by the fourth operand to produce a fourth result, the fourth result representing a sixth complex number;
wherein the first result and the fourth result are third data.

30. The system of claim 29, wherein the multiplication of the first operand by the second operand is performed in parallel with the multiplication of the third operand by the fourth operand.

31. The system of claim 29, wherein a least significant bits portion of the first data has the first operand, a most significant bits portion of the first data has the third operand, a least significant bits portion of the second data has the second operand, a most significant bits portion of the second data has the fourth operand, a least significant bits portion of the third data has the first result, and a most significant bits portion of the third data has the second result.

32. A system for multiplying complex numbers, comprising:
means for multiplying a real part of a first complex number by a real part of a second complex number to produce a first part of a real part of a third complex number;
means for multiplying an imaginary part of the first complex number by an imaginary part of the second complex number to produce a second part of the real part of the third complex number;
means for performing a first arithmetic function between the first part of the real part of the third complex number and the second part of the real part of the third complex number;
means for multiplying the imaginary part of the first complex number by the real part of the second complex number to produce a first part of an imaginary part of the third complex number;
means for multiplying the real part of the first complex number by the imaginary part of the second complex number to produce a second part of the imaginary part of the third complex number;
means for performing a second arithmetic function between the first part of the imaginary part of the third complex number and the second part of the imaginary part of the third complex number;
means for rounding the third complex number to produce a rounded third complex number; and means for saturating the rounded third complex number to produce a saturated third complex number;
wherein the means for multiplying the real part of the first complex number by the real part of the second complex, the means for multiplying the imaginary part of the first complex number by the imaginary part of the second complex number, the means for multiplying the imaginary part of the first complex number by the real part of the second complex number, and the multiplying the real part of the first complex number by the imaginary part of the second complex number are configured to perform in parallel.

33. The system of claim 32, wherein the first arithmetic function is subtracting the second part of the real part of the third complex number from the first part of the real part of the third complex number and the second arithmetic function is adding the second part of the imaginary part of the third complex number to the first part of the imaginary part of the third complex number.

34. The system of claim 32, wherein the first arithmetic function is adding the second part of the real part of the third complex number to the first part of the real part of the third complex number and the second arithmetic function is subtracting the second part of the imaginary part of the third complex number from the first part of the imaginary part of the third complex number.

35. The system of claim 32, wherein the means for performing the first arithmetic function and the means for performing the second arithmetic function are configured to perform in parallel.

* * * * *